(12) United States Patent
Boardman et al.

(10) Patent No.: US 8,965,590 B2
(45) Date of Patent: Feb. 24, 2015

(54) INTELLIGENT ELECTRICAL DISTRIBUTION GRID CONTROL SYSTEM DATA

(75) Inventors: Ethan Clair Boardman, Seattle, WA (US); Subrahmanyam Saraswati Venkata, Oro Valley, AZ (US)

(73) Assignee: Alstom Grid Inc., Redmond, WA (US)

(*) Notice: Subject to any disclaimer, the term of this patent is extended or adjusted under 35 U.S.C. 154(b) by 772 days.

(21) Appl. No.: 13/155,615

(22) Filed: Jun. 8, 2011

(65) Prior Publication Data

US 2012/0316697 A1  Dec. 13, 2012

(51) Int. Cl.
*G06F 1/26* (2006.01)
*G06F 1/32* (2006.01)
*H02J 13/00* (2006.01)

(52) U.S. Cl.
CPC ......... *H02J 13/0086* (2013.01); *H02J 13/0079* (2013.01)
USPC ............ 700/289; 700/295; 700/291; 700/294

(58) Field of Classification Search
CPC ....... G05B 15/02; Y04S 20/221; H04L 67/12; H04L 43/0817; G06Q 50/06; H02J 13/0013; H02J 13/0086; H02J 13/0079
USPC .................. 700/291, 295, 289, 296
See application file for complete search history.

(56) References Cited

U.S. PATENT DOCUMENTS

| | | | |
|---|---|---|---|
| 3,944,723 A | 3/1976 | Fong | |
| 4,689,735 A | 8/1987 | Young | |
| 6,347,027 B1 | 2/2002 | Nelson et al. | |
| 6,434,512 B1 | 8/2002 | Discenzo | |
| 6,697,240 B2 | 2/2004 | Nelson et al. | |
| 7,289,887 B2 | 10/2007 | Rodgers | |
| 7,398,194 B2 | 7/2008 | Evans et al. | |
| 7,724,778 B2 | 5/2010 | Ying | |
| 7,747,739 B2 | 6/2010 | Bridges et al. | |
| 7,844,370 B2 | 11/2010 | Pollack et al. | |
| 8,335,595 B2 | 12/2012 | Tolnar et al. | |
| 8,350,412 B2 | 1/2013 | Massie et al. | |
| 8,401,709 B2 | 3/2013 | Cherian et al. | |
| 8,417,391 B1 * | 4/2013 | Rombouts et al. | 700/291 |
| 8,447,434 B1 | 5/2013 | Harris et al. | |
| 8,525,522 B2 | 9/2013 | Gong et al. | |
| 8,558,551 B2 | 10/2013 | Mynam et al. | |

(Continued)

OTHER PUBLICATIONS

Bose Smart Transmission Grid Applications and Their Supporting Infratructure, pp. 11-19, Jun. 2010.*
Higgins et al. Distributed Power System Automation With IEC 61850, IEC 61499, and Intelligent Control, pp. 81-92, Jan. 2011.*
SCADA (Supervisory Control and Data Acquisition). http://en.wikipedia.org/wiki/SCADA. 10 pages.

(Continued)

*Primary Examiner* — Larry Donaghue
(74) *Attorney, Agent, or Firm* — Amin, Turocy & Watson, LLP

(57) ABSTRACT

Aspects of a multi-level electrical distribution control system associated with an electrical distribution grid are disclosed. Data access and processing across the multi-level control system and the electrical distribution grid can provide improved utilization of energy within the electrical distribution grid. Further, dynamic reconfiguration of the electric distribution grid can be based distributed processing and access to information relating to the electrical distribution control system or electrical distribution grid. An encapsulated DNNC data element is disclosed as an efficient and secure means of accessing data across the multi-level electrical distribution control system or the associated electrical distribution grid.

20 Claims, 12 Drawing Sheets

(56) References Cited

U.S. PATENT DOCUMENTS

| | | | |
|---|---|---|---|
| 8,588,991 | B1 | 11/2013 | Forbes, Jr. |
| 8,730,837 | B2 | 5/2014 | Popescu et al. |
| 2002/0064010 | A1 | 5/2002 | Nelson et al. |
| 2003/0055677 | A1 | 3/2003 | Brown et al. |
| 2004/0081193 | A1 | 4/2004 | Forest et al. |
| 2005/0005093 | A1* | 1/2005 | Bartels et al. ............... 713/150 |
| 2005/0039040 | A1 | 2/2005 | Ransom et al. |
| 2006/0195229 | A1 | 8/2006 | Bell et al. |
| 2007/0005315 | A1 | 1/2007 | Evans et al. |
| 2007/0087756 | A1 | 4/2007 | Hoffberg |
| 2007/0124026 | A1 | 5/2007 | Troxell et al. |
| 2007/0206644 | A1 | 9/2007 | Bertsch et al. |
| 2007/0239373 | A1 | 10/2007 | Nasle |
| 2007/0285079 | A1 | 12/2007 | Nasle |
| 2008/0109205 | A1 | 5/2008 | Nasle |
| 2008/0272934 | A1 | 11/2008 | Wang et al. |
| 2009/0129376 | A1 | 5/2009 | Johnson |
| 2009/0228324 | A1 | 9/2009 | Ambrosio et al. |
| 2009/0281673 | A1 | 11/2009 | Taft |
| 2009/0281674 | A1 | 11/2009 | Taft |
| 2009/0281679 | A1 | 11/2009 | Taft et al. |
| 2009/0299542 | A1 | 12/2009 | Nuqui et al. |
| 2009/0319093 | A1 | 12/2009 | Joos et al. |
| 2010/0017214 | A1 | 1/2010 | Ambrosio et al. |
| 2010/0070089 | A1 | 3/2010 | Harrod et al. |
| 2010/0138363 | A1 | 6/2010 | Batterberry et al. |
| 2010/0152910 | A1 | 6/2010 | Taft |
| 2010/0177450 | A1 | 7/2010 | Holcomb et al. |
| 2010/0179704 | A1 | 7/2010 | Ozog |
| 2010/0241560 | A1 | 9/2010 | Landau-Holdsworth et al. |
| 2010/0286840 | A1 | 11/2010 | Powell et al. |
| 2010/0317420 | A1 | 12/2010 | Hoffberg |
| 2010/0324844 | A1 | 12/2010 | Marti |
| 2011/0004446 | A1 | 1/2011 | Dorn et al. |
| 2011/0004513 | A1 | 1/2011 | Hoffberg |
| 2011/0035073 | A1 | 2/2011 | Ozog |
| 2011/0063126 | A1 | 3/2011 | Kennedy et al. |
| 2011/0071695 | A1 | 3/2011 | Kouroussis et al. |
| 2011/0074436 | A1 | 3/2011 | Nowicki et al. |
| 2011/0093127 | A1 | 4/2011 | Kaplan |
| 2011/0106321 | A1 | 5/2011 | Cherian et al. |
| 2011/0109266 | A1 | 5/2011 | Rossi |
| 2011/0172838 | A1 | 7/2011 | Pai et al. |
| 2011/0231028 | A1 | 9/2011 | Ozog |
| 2011/0313581 | A1 | 12/2011 | Genc et al. |
| 2011/0313586 | A1 | 12/2011 | Popescu et al. |
| 2012/0029710 | A1 | 2/2012 | Dodderi et al. |
| 2012/0029720 | A1 | 2/2012 | Cherian et al. |
| 2012/0126994 | A1 | 5/2012 | Sobotka et al. |
| 2012/0175951 | A1 | 7/2012 | Pamulaparthy et al. |
| 2012/0181869 | A1 | 7/2012 | Chapel et al. |
| 2012/0229082 | A1 | 9/2012 | Vukojevic et al. |
| 2012/0253540 | A1 | 10/2012 | Coyne et al. |
| 2012/0277926 | A1 | 11/2012 | Nielsen et al. |
| 2012/0310423 | A1 | 12/2012 | Taft |
| 2012/0310434 | A1 | 12/2012 | Taft |
| 2012/0316689 | A1 | 12/2012 | Boardman et al. |
| 2012/0316691 | A1 | 12/2012 | Boardman et al. |
| 2012/0316696 | A1 | 12/2012 | Boardman et al. |
| 2012/0316697 | A1 | 12/2012 | Boardman et al. |
| 2013/0035802 | A1 | 2/2013 | Khaitan et al. |
| 2013/0036311 | A1 | 2/2013 | Akyol et al. |
| 2013/0113291 | A1 | 5/2013 | Recker et al. |

OTHER PUBLICATIONS

IEC 61850. http://en.wikipedia.org/wiki/IEC_61850, 4 pages.
"Electric Power Transmission". http://en.wikipedia.org/wiki/Electricity_transmission. Last accessed Dec. 30, 2010, 16 pages.
"Electric Power Distribution". http://en.wikipedia.org/wiki/Electric_power_distribution. Last accessed Dec. 30, 2010, 6 pages.
"Power System Automation". http://en.wikipedia.org/wiki/Power_system_automation. Last accessed Dec. 30, 2010, 4 pages.
"Smart Grid". http://en.wikipedia.org/wiki/Smart_power_grid. Last accessed Dec. 30, 2010, 16 pages.
"Transformer" http://en.wikipedia.org/wiki/Transformer. Last accessed Dec. 30, 2010, 23 pages.
"Demand Response". http://en.wikipedia.org/wiki/Demand_response. Last accessed Dec. 30, 2010, 10 pages.
"Distributed Generation". http://en.wikipedia.org/wiki/Distributed_generation. Last accessed Dec. 30, 2010, 5 pages.
Office Action dated Jun. 21, 2013 for U.S. Appl. No. 13/155,601, 30 pages.
Zimmer, et al. "Fault Tolerant Network Routing through Software Overlays for Intelligent Power Grids", 2010, Proceedings of the 2010 I EEE 16th international Conference on Parallel and Distributed Systems, ICPADS '10. 2010, 8 pages.
Motorola "Bringing Self-Awareness to the Grid, SCADA Systems Enhance Electric Utility Operations", 2009, Retrieved from the Internet on Jun. 12, 2013 at "www.motorola.com/ace3600", 4 pages.
Spack, et al. Intelligent Transformer Substations in Modern Medium Voltage Networks as Part of "Smart Grid", Nov. 2011, IEEE Sccion El Salvador, 7 pages.
Zhabelova, et al. "Multi-Agent Smart Grid Automation Architecture Based on IEC 61850/61499 Intelligent Logical Nodes", 2011, IEEE Transactions on Industrial Electronics, 10 pages.
Office Action dated Jul. 18, 2013 for U.S. Appl. No. 13/155,594, 35 pages.
Office Action dated Apr. 9, 2013 for U.S. Appl. No. 13/155,707, 41 pages.
Office Action dated Mar. 22, 2013 for U.S. Appl. No. 13/105,393, 70 pages.
Office Action dated Sep. 30, 2013 for U.S. Appl. No. 13/155,707, 56 pages.
Anjan Bose, "Smart Transmission Grid Applications and their supporting Infrastructure" IEEE Transactions on Smart Grid vol. 1, No. 1 Jun. 2010, pp. 11-19.
Budka et al, "Communication Network Architecture and Design Principles for Smart Grids", Journal Bell Labs Technical Journal—Green Information and Communications Technology (ICT) for Eco-Sustainability archive vol. 15 Issue 2, Aug. 2010, pp. 205-227.
Li et al.,"Smart Transmission Grid: Vision and Framework" IEEE Transactions on Smart Grid, vol. 1 Issue 2, Sep. 2010, pp. 168-177.
Office Action dated Jan. 16, 2014 for U.S. Appl. No. 13/155,594, 38 pages.
Office Action dated Jan. 10, 2014 for U.S. Appl. No. 13/155,601, 24 pages.
Office Action dated Mar. 14, 2014 for U.S. Appl. No. 13/155,707, 43 pages.
Office Action dated Apr. 10, 2014 for U.S. Appl. No. 13/155,751, 47 pages.
Office Action dated Apr. 21, 2014 for U.S. Appl. No. 13/105,393, 46 pages.
Office Action dated May 8, 2014 for U.S. Appl. No. 13/155,594, 40 pages.
Office Action dated Jun. 19, 2014 for U.S. Appl. No. 13/155,601, 30 pages.
Goldsman, et al. "Smart Dust: U Large-Scale, Low-Power, Flexible Sensor Networks", Feb. 2004, Dept of Electrical and Computer Engineering, University of Maryland, 40 pages.
Nikravesh, et al. "Control of Nonlinear Systems via Dynamic Neural Network Control (DNNC): Adaptive Control, Constraint Handling and Extension to MIMO Case", Mar. 1995, University of South Carolina and University of California, Berkeley, 5 pages.
Office Action dated Aug. 13, 2014 for U.S. Appl. No. 13/155,707, 62 pages.
Kempton et al., "Vehicle-to-grid power fundamentals: Calculating capacity and net revenue" Journal of Power Sources vol. 144 (Apr. 2005), pp. 268-279.
Brown et al., "Electric vehicles: The role and importance of standards in an emerging market" Energy Policy vol. 38, Mar. 2010, pp. 3797-3806.
Office Action dated Aug. 28, 2014 for U.S. Appl. No. 13/155,594, 49 pages.
Office Action dated Oct. 3, 2014 for U.S. Appl. No. 13/155,751, 57 pages.

* cited by examiner

INTELLIGENT ELECTRICAL DISTRIBUTION GRID CONTROL SYSTEM DATA

TECHNICAL FIELD

The present application relates generally to electrical grids, and more particularly, to intelligent electrical grids.

BACKGROUND

Traditional electrical distribution systems have existed relatively unchanged in control topography for many years, due in part to the high cost of altering the infrastructure. More recently, efforts to improve the efficiency and reliability of electrical distribution grids have increased from both private and public interests in electrical distribution systems incorporating intelligent or computerized control systems, e.g., "smart grids". One well-publicized component related to "smart grids" is the smart electrical meter. The smart meter, found at both residential and commercial customers, allows electrical consumption information to be transmitted to a distribution-level control center (DCC).

However, the traditional DCC operates in a flat control topography environment. As such, data from smart meters is typically communicated to the DCC for use in control of the electrical distribution grid. This conventional topography for electrical distribution control systems does not incorporate intermediate levels of data acquisition, processing, and grid control. Where there are ever increasing numbers of smart meters, though, the flat topography becomes problematic. For example, data transmission from millions of smart meters to a single DCC can require large amounts of bandwidth and can be sensitive to communications network fluctuations or faults. In a further example, data consumption at the DCC can be computationally intensive. Issues with the flat control topography, including data transmission and data consumption aspects, can be further magnified where additional smart devices are deployed in the electrical distribution grid, e.g., fault sensors, micro-environmental data, etc.

Additionally, the flat control topography of the traditional electrical distribution system is likely to face hurdles with the incorporation of distributed power generation systems. Many electrical sources in distributed generation systems are time variant. For example, wind turbines are subject to power fluctuation in time based on wind speed, solar power is time variant based on cloud cover, plug-in electrical vehicles with surplus power can be disconnected at a moment's notice, etc. Distributed power generation is likely to introduce a need for high speed adjustments to portions of the electrical distribution system, as close to real time adjustment as possible, and simultaneously be likely to produce a flood of electrical consumption data. In a flat control topography, this additional data flow is likely to exacerbate the deficiencies of data throughput and processing. This can result in slower dynamic adjustment of the distribution network where, in fact, faster adjustment is desirable due to the increased demand for processing of such data.

Further, additional sensitivity to communications network faults causes the flat topography control system to become increasingly perilous to grid control and can seriously affect downstream consumers. As more data passes directly to the DCC due to the proliferation of smart devices generating consumable data for grid control, the DCC becomes more dependent on this additional data for proper grid control. Where the DCC is dependent on this increased data flow for proper grid control, even minor diminished bandwidth can impair the flat grid control system by reducing the amount of data accessible for proper control. Hyper-dependable communications systems over an entire distribution grid is desirable for a reliable electrical system, but is burdened under the sheer volume of smart data anticipated in the future electrical grid.

Moreover, historically, energy supply was considered essentially limitless in that a transmission grid could provide as much energy as a distribution grid could distribute to subscribers. For example, when a subscriber turned on a light bulb, somewhere a coal fired power plant burned a little more coal to provide the energy to illuminate the bulb. Where more energy was needed, additional power plants were added to the electrical grids. However, the costs of adding additional large-scale power plants to electrical grids to maintain an excess of supply in the energy market can be prohibitive. For example, construction costs can be large, environmental footprints can be daunting, and maintenance and upkeep under increasingly strict regulation can be demanding. As such, it is becoming increasingly desirable to wring more efficiency out of existing energy resources rather than adding increased capacity by traditional routes.

The above-described deficiencies of traditional electrical transmission and distribution grids are merely intended to provide an overview of some of the problems of conventional technologies, and are not intended to be exhaustive. Other problems with conventional technologies and corresponding benefits of the various non-limiting embodiments described herein may become further apparent upon review of the following description.

SUMMARY

The following presents a simplified summary of the disclosed subject matter in order to provide a basic understanding of some aspects of the disclosed subject matter. This summary is not an extensive overview of the subject disclosure. It is intended to neither identify key or critical elements of the subject disclosure nor delineate the scope of the disclosed subject matter. Its sole purpose is to present some concepts of the disclosed subject matter in a simplified form as a prelude to the more detailed description that is presented later.

One or more embodiments of the disclosed subject matter illustrate a multi-level electrical distribution control system associated with an electrical distribution grid. The multi-level electrical distribution control system can include a first distribution network node controller (DNNC) component. The first DNNC component can further include a DNNC data component configured to access electrical distribution grid data or electrical distribution control system data. The first DNNC component can facilitate access to the electrical distribution grid data or electrical distribution control system data by a second DNNC component.

In another non-limiting aspect, a data wrapper structure is disclosed that can encapsulate electrical distribution grid data or electrical distribution control system data. The data wrapper structure can include an identifier portion and a payload portion. The payload portion can carry the electrical distribution grid data or electrical distribution control system data in an efficient and secure manner. In some embodiments, the data wrapper structure can also include a plurality of values, objects, executable code, or other instances of data wrapper structures as payload.

A further embodiment of the disclosed subject matter relates to a method of accessing electrical distribution grid data as part of generating DNNC data. The DNNC data can be stored for future access. Further, DNNC data can be manipulated or processed to generate additional DNNC data that can facilitate efficient and secure control of at least an electrical distribution control system.

To the accomplishment of the foregoing and related ends, the disclosed subject matter, then, comprises the features hereinafter fully described. The following description and the annexed drawings set forth in detail certain illustrative aspects of the disclosed subject matter. However, these aspects are indicative of but a few of the various ways in which the principles of the disclosed subject matter may be employed. Other aspects, advantages and novel features of the disclosed subject matter will become apparent from the following detailed description of the disclosed subject matter when considered in conjunction with the drawings.

DETAILED DESCRIPTION

Figure 1:
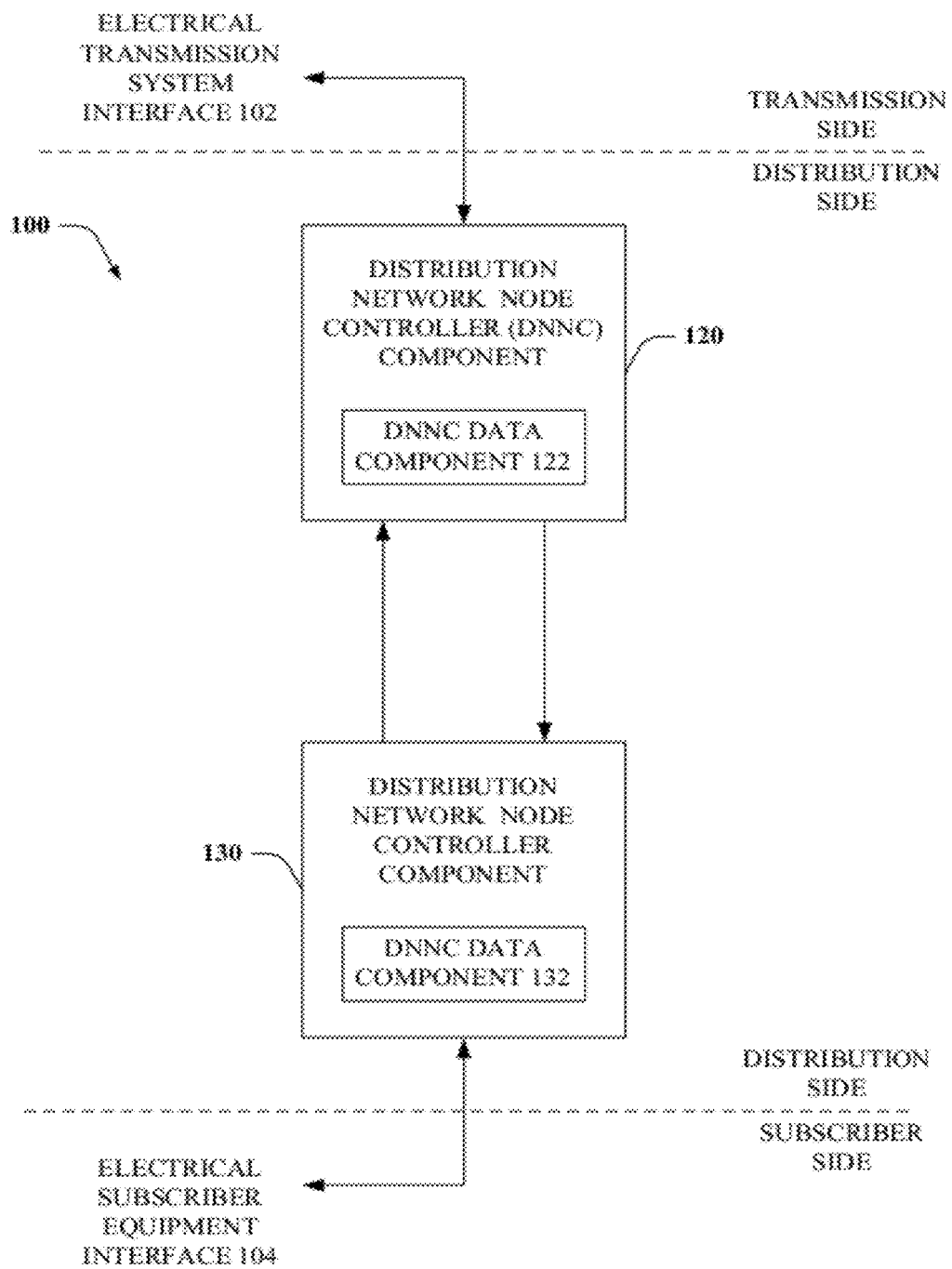
FIG. 1 is a block diagram illustrating a system having a multi-level distribution topography configured to access data in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

The use of a multi-level control system, including data acquisition and processing, can offer improvements in electrical distribution system response speed, efficiency, and reliability. For example, control data can incorporate data from "health sensors" on electrical line poles to facilitate dynamic rerouting of power around a broken pole, to notify repair crews automatically of worn or damaged conductors to allow repair before a catastrophic failure, etc. As another example, as plug-in electric vehicles become more popular, charging these vehicles can be power intensive, especially where several vehicles "coming home from work" attempt to charge simultaneously. Control data relating to high loads at a residential transformer, for example from plugging in several electric cars, can trigger protective action to safeguard the transformer, can push out incentivized charging scheme data to the electrical consumers to lessen the peak power demand, etc.

Additionally, the use of multi-level control systems can be scalable to accommodate growing volumes of data as more electrical distribution system devices become highly computerized and data intensive. For example, data aggregation at mid-level distribution network node controller (DNNC) components, compression and transfer of large volumes of raw data from low-level DNNC components to higher-level DNNC components, pushing down of new model sets from high-level DNNC components to low-level DNNC components, distribution of new pricing schemes, etc. As a non-limiting example, energy usage data can be aggregated for an entire neighborhood providing information on energy usage at a high level of temporal granularity. Further, this aggregated data can be compressed, for example, by binning energy consumption in 1%, 5%, 10% bins, etc., such that energy consumption information can be bubbled up to higher-level DNNC components consuming less bandwidth.

Data in traditional electrical distribution grids, which are often viewed as unlimited sources of electrical energy and are expected to supply any amount of power requested by subscribers, can generally be poorly leveraged and underutilized due to the traditionally flat control system topography. For example, data from smart meters can be communicated directly to a DCC, which can consume significant amounts of bandwidth for high volumes of data. In contrast, multi-tier electrical distribution control system can process, aggregate, compress data, etc., such that, for example, data can be used at various levels within the electrical distribution control system, be used more efficiently, and be communicated with more efficiency. Further, where energy consumption continues to increase at a rate that outpaces energy production and/or effective distribution, energy can become a limited commodity. Basic supply and demand theory suggests that as energy becomes a limited commodity, the cost of that commodity will rise with increased demand absent other suppliers. Thus, subscribers can experience increased energy costs from an inefficient use of a limited resource. As such, it can be desirable to more efficiently consume energy from a transmission grid.

In an aspect, additional energy capacity can be added to a system by way of distributed generation of power. Distributed generation can be associated with numerous small sources of energy, e.g., solar panels on homes, small wind farms, etc., rather than fewer large sources of energy, e.g., coal fired power plants, large dams and hydroelectric systems, etc. These distributed sources are thus, typically added to the electrical distribution grid rather than the electrical transmission grid. These numerous small energy sources can lower the demand for energy from the connection to the electrical transmission grid. The use of distributed generation can also be associated with a dramatic increase in data acquisition, handling, and processing, for example, to bring generation on and off the grid in a safe and cost effective manner.

In a further aspect, more efficient use of energy by subscribers to an electrical utility can reduce the demand for energy from an electrical transmission system. As an example, the implementation of peak and off-peak electrical energy periods and correspondingly different fees per unit energy can result in modification of the subscriber consumption of energy. For example, people can modify their behavior to save money, such as by drying clothes late at night in an off-peak time/rate window rather than drying clothes at a higher cost during the dinner hour in a peak-time/rate window. However, this system can be somewhat rudimentary in that the dynamic changes in energy demand can be poorly reflected in a relatively static peak/off-peak pricing structure. To facilitate more accurate techniques for capturing the ebb and flow of energy demand and influence subscriber behaviors with market-type forces, advanced electrical distribution grid control systems and methods can be employed. These advanced electrical distribution grid control systems and methods, collectively referred to as smart or intelligent distribution grid systems or methods, can employ a multi-level control system, including data acquisition and processing, that can offer improvements in electrical distribution system response speed, efficiency, and reliability.

Further, the use of multi-level control systems can employ real time, or near real time, electrical distribution grid data in pricing models that can more accurately track, and thus more efficiently influence, subscriber access to the energy supply. Where complex or dynamic energy access models arise from smart distribution grid systems and methods, subscriber side equipment can be deployed to facilitate subscriber-side participation in corresponding efficient energy access programs. For example, rather than rudimentary peak/off-peak programs, a dynamic pricing model can enable a dynamic subscriber energy market that allows subscribers to participate in energy transactions at a dynamically fluctuating market rate, e.g., a clothes dryer could wait to dry clothes until the rate dropped below a threshold cost. Thus, if energy consumption is low, the rates can also be low and the clothes can be dried sooner than might occur under a peak/off-peak system. Similarly, if energy consumption is high, the rates can be high and the clothes can be dried later than might have occurred with the peak/off-peak system. Moreover, the subscriber can determine the cost they will bear to access the resource at a much finer level of granularity that might otherwise be possible.

Dynamic energy access models also can facilitate prioritized access. Prioritized access can enable subscribers to define a level of energy access that can be based on any parameter, not just cost. For example, a subscriber can designate certain electrical systems as critical systems that should always have access to energy (e.g., medical equipment, emergency lighting, security systems, etc.) Similarly, a subscriber can designate certain electrical systems as luxury systems that should only have access to energy on a case-by-case basis (e.g., landscape lighting, passive display devices (digital picture frames), etc.) Further, a subscriber can designate certain electrical systems as cost-based systems that should have access to energy based on cost, such that certain energy uses are of a lower priority, e.g., clothes drying, and thus are enabled only at a lower price than a higher priority energy use, cooking stove use.

Multi-level control systems in the electrical distribution grid can also facilitate reconfiguration of the distribution grid to enable alternate distribution topographies that can be beneficial to efficient energy consumption. In an aspect, where certain sections of a distribution grid are using large amounts of power, this can be associated with higher operating costs and/or lower distribution efficiency, e.g., energy losses associated with heating from high current loads through conductors, running transformers in excess of their ratings, etc. By reconfiguring the distribution grid, it can be possible to split high consumption areas such that they access the distribution grid in a more efficient or cost effective manner. For example, a factory can be served by a first transformer and homes for factory workers by a second transformer. A multi-level control system can designate, when the workers return home in the evening, that the first transformer, e.g., the factory transformer, be reconfigured to connected to the distribution conductors for the homes to reduce the load on the second transformer as energy consumption at the factory drops and consumption at the homes increases.

Thus, by having better control and knowledge of the electrical distribution grid, energy access and distribution of energy resources can be adapted which can result in lower levels of energy consumption. Data can be passed by components of an electrical distribution control system, e.g., a DNNC component. As a non-limiting example, a top-level DNNC can dynamically adjust the primary coil tap-voltage at a substation transformer based on data processed from mid- and bottom-level DNNC components. The mid- and bottom-level components can further adaptively configure the topography of the distribution network in accord with configuration rules to better distribute the energy from the substation. Further, the top-level DNNC component can access pricing models and can push down pricing models to the bottom-level DNNC components for dynamically pricing energy access to subscribers.

As such, coordination between the components of an intelligent electrical distribution grid control system can facilitate demand response, e.g., systematically formulating, applying and solving multi-objective optimization formulas to demand response models. Demand response is providing the impetus for accelerating the smart grid. It can be critical for realizing smart grid success. Further, prioritization of subscriber-level energy access can be impacted by information distribution in across electrical distribution grid control systems. For example, optimally managing two-way power flow without exceeding the thermal capacities of distribution transformers and lines can be included in optimization formulas for prioritization of energy access, e.g., by influencing costs or capping energy access. Further, it can be highly desirable to schedule distributed generating sources optimally depending on the status of the system. Moreover, adaptive distribution systems can provide reduced equipment stress, which can in turn provide better reliability.

FIG. 1 is a block diagram illustrating a system 100 having a multi-level distribution topography configured to access data in accordance with aspects of the disclosed subject matter. System 100 can include a multi-level electrical distribution control system comprising a distribution network node controller (DNNC) component 120 communicatively coupled to DNNC component 130. This multi-level electrical distribution control system can be communicatively coupled to electrical transmission system interface 102 across the transmission-distribution boundary, and communicatively coupled to electrical subscriber equipment interface 104 across the distribution-subscriber boundary. DNNC component 120 of system 100 can further comprise DNNC data component 122. Similarly, DNNC component 130 can further comprise DNNC data component 132. Various aspects and examples of multi-level control system topography are disclosed in U.S. application Ser. No. 13/155,594, filed Jun. 8, 2011, entitled "MULTI-LEVEL TOPOGRAPHY FOR ELECTRICAL DISTRIBUTION GRID CONTROL", which is hereby incorporated by reference in its entirety.

DNNC component 120 can facilitate access to electrical distribution grid data by way of DNNC data component 122. Electrical distribution grid data can be accessed by DNNC component 120 and stored on DNNC component 120. Further, electrical distribution grid data can be accessed by DNNC component 120 and processed into electrical distribution control system data, which can also be referred to as "DNNC data". For example, raw differential voltage can be measured between the primary and secondary side of a distribution transformer by a sensor communicatively coupled to DNNC component 120. This raw differential voltage measurement can be directly stored as electrical distribution grid data by way of DNNC component 120, or can be processed and stored as "DNNC data". This DNNC data can be the same as, or similar to, the raw differential voltage measurement, can be a modified form of the raw differential voltage measurement, or be related to the raw differential voltage measurement, etc. For example, where the raw differential voltage measurement is 200 VAC, the DNNC data can be 200 VAC, 2.6% (where the conductor voltage is 7500 VAC), as a designation of "acceptable" (where a differential measurement of 200 VAC is acceptable), etc. Furthermore, conversion of raw data into DNNC data can include security features, such as, encoding DNNC data in a secure manner, wrapping data in a secure envelope, etc.

Moreover, DNNC component 120 can facilitate access to electrical distribution control system data by way of DNNC data component 122. In an aspect, electrical distribution control system data can comprise nearly any type of data related to control of the electrical distribution grid or components of the electrical distribution control system. Electrical distribution control system data can include secure or unsecure data that can be converted into secure data, e.g., by way of conversion into DNNC data. For example, electrical distribution control system data can comprise a model, a rule, a control variable value, a measurement, a message, etc. Similarly, DNNC component 130 can facilitate access to electrical distribution grid data and/or electrical distribution control system data by way of DNNC data component 132.

In an aspect, DNNC component 120 can access electrical distribution grid data and/or electrical distribution control system data from DNNC component 130 by way of DNNC component 122. Similarly, DNNC component 130 can access electrical distribution grid data and/or electrical distribution control system data from DNNC component 120 by way of DNNC data component 132. For example, where a temperature sensor for a distribution transformer is communicatively coupled to DNNC component 130, temperature measurements the transformer can be stored as DNNC data at DNNC component 130. This DNNC temperature data can be accessed by DNNC component 120 by way of DNNC data component 122. DNNC data component 122 can communicatively couple with DNNC component 130 to access the DNNC temperature data stored thereon. As a second non-limiting example, DNNC component 120 can store a pricing model, which can be accessed by DNNC component 130 by way of DNNC data component 132. DNNC data component 132 can communicatively couple with DNNC component 120 to access the pricing model. As such, the pricing model can be pushed out to subscriber side equipment from DNNC component 130.

Communicating electrical distribution grid data and/or electrical distribution control system data by way of the DNNC data component can comprise one or more data access schemes. These schemes can include, among others, direct access to data, access to data storage, or access to data objects or files. For example, a DNNC data value can be directly accessed by way of the DNNC data component, e.g., DNNC data component 122 or 132. As a second example, a DNNC data value can be stored in a relational database, which can be accessed by way of the DNNC data component. As a third example, a DNNC data value can be part of the data object that can further comprise other data and/or functions. As a fourth example the DNNC data value can be part of a DNNC data value file, which can be transferred by way of a DNNC data component. Numerous other methods and techniques for accessing DNNC data and/or electrical distribution grid data can be applicable but are not further disclosed herein for the sake of clarity and brevity, although all such methods and techniques are to be considered within the scope of the present disclosure.

In a further aspect, communication between the transmission side and the subscriber side, by way of the distribution side of an electrical grid, can be leveraged to create favorable conditions for subscribers to more efficiently access energy resource. This can include reduced energy access, accessing energy in a more predictable manner, e.g., scheduling energy access, accessing energy in a more evenly distributed manner, e.g., shifting energy access from peak times to off-peak times, etc. As a non-limiting example, where an electrical utility has contracted for an amount of energy and additional energy usage would carry a premium cost to the utility, energy access from the transmission grid can be monitored and communicated to electrical distribution network control system component 120. Based, at least in part, on this information, electrical distribution network control system component 120 can distribute a pricing model to subscribers over the distribution grid, for example, by way of DNNC 130. Based on this pricing model, smart homes or smart appliances can adapt energy access plans based on subscriber preferences and utility limitations. These subscriber energy access plans can be communicated back to the electrical distribution network control system, for example, by way of DNNC component 130 and an expected energy access for the distribution grid can be generated. Based on the contract price and premium price of energy, a determination can be made to further modify subscriber pricing to adapt energy access to the contracted energy allocation or to purchase/sell additional blocks of energy from/to the transmission grid.

In one embodiment, this can create a real time, or near real time, subscriber-level dynamic rate energy access market wherein subscribers can prioritize energy access according to one or more parameters. This subscriber-level market can allow subscriber demand and distribution grid supply to drive efficient energy access. Communication with the energy commodity supplier, e.g., the transmission grid, can improve the planning, development, and use of the transmission grid. As a non-limiting example, determining a market rate for energy access can facilitate educated decision regarding expansion if the transmission grid.

In another embodiment, scheduled energy access and energy access shifting can result in more flat energy access across the electrical grid. Scheduled energy access can relate to advanced planned energy access, for example, a hospital laundry facility can schedule drying of linens to late evening and schedule that energy access such that the utility has advanced notice that an energy demand will occur at a known time. Energy access shifting can relate to energy access that can be reasonably delayed and can be considered of lower priority. Energy access that is related to lower priority can be delayed until other parameters are met. As a non-limiting example, charging a Plug-in/Hybrid Electric Vehicle (PEV) can be delayed until there are sufficient energy resources, such as, in off-peak hours, so long as the PEV is charged for the morning commute. Thus, the charging of the PEV can be time shifted to a more optimal time period to reduce peak demand on the electrical grid. As another non-limiting example, a charged PEV can discharge to provide energy during peak times and be recharged at a later off-peak time. As further non-limiting examples, sharing of energy resources can be accomplished, such as charging three PEVs either at full rate sequentially one PEV at a time; at a slower rate in parallel where each PEV simultaneously receives ⅓ of the current; at a slower rate in a shared sequential mode where each PEV receives full current for a short period, then the next PEV receives full current for a short period, and so on, cycling through the PEVs until they all reach full charge; etc.

In a further embodiment, information accessed by electrical distribution network control system component(s) 120 and/or 130 and accessed by way of DNNC data component(s) 122 and 132, respectively, can facilitate dynamic reconfiguration of the distribution grid. Where the distribution grid can, for example, provide information about transformer loading, equipment faults, etc., the distribution grid can dynamically reconfigure to adapt to the conditions. As a non-limiting example, data that an electrical conductor is damaged can be processed to develop a reconfiguration map of the electrical distribution network control system and the electrical distribution grid to bypass the damage conductor. This reconfiguration map can then be implemented by dynamically adapting electrical distribution network control system and/or the electrical distribution grid.

Figure 2:
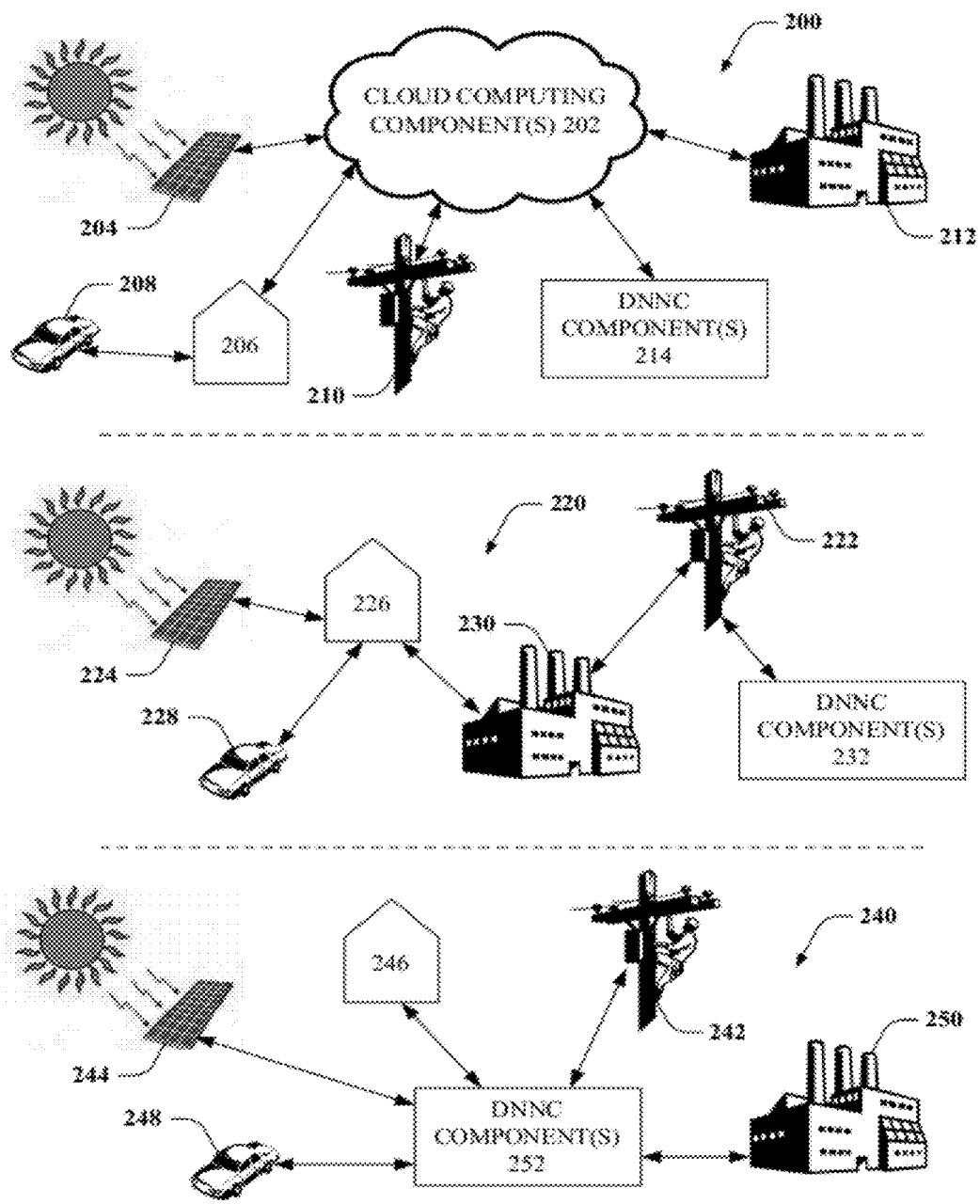
FIG. 2 is a graphic illustration of non-limiting exemplary systems having different data communication schemes in accordance with aspects of the disclosed subject matter.

FIG. 2 is a graphic illustration of non-limiting exemplary systems 200, 220, and 240, having different data communication schemes in accordance with aspects of the disclosed subject matter. System 200 can comprise a plurality of components, including distributed generation resource 204, a residential building 206, PEV 208, electrical distribution grid equipment 210, a factory 212, and DNNC component(s) 214. Each of components 204 through 212 can be communicatively coupled to DNNC component(s) 214 by way of cloud computing component(s) 202. As such, electrical distribution grid data and/or DNNC data can be accessed by way of the cloud. This can provide a great deal of flexibility and expansion capability to utilities desiring to implement a smart infrastructure for an electrical distribution control system. For example, additional storage for large volumes of data can be readily accessed in a cloud-computing environment.

In an aspect, there can be multiple DNNC components 214 distributed throughout system 200. For example there can be a bottom-level DNNC component 214 (not illustrated) located at distributed generation resource 204, bottom-level DNNC component 214 (not illustrated) located at factory 212, etc., These additional DNNC components can reduce the transmission of high volumes of raw electrical distribution grid data by way of the cloud by using various processing and/or compression techniques to convert raw electrical distribution grid data into DNNC data that can then be communicated to other DNNC components of system 200 by way of the cloud, illustrating an advantage of a multi-tiered electrical distribution control system.

System 220 can comprise similar components to system 200. For example, system 220 can include distributed generation resource 224, residential building 226, PEV 228, factory 230, electrical distribution grid equipment 222, and DNNC component(s) 232. System 220, in contrast a system 200, can employ an interconnected "daisy chain" communication scheme. As such, the various components of system 220 can communicate with DNNC components 232 by facilitating access to data including communicative couplings with other components of system 220. As a non-limiting example, distributed generation resource 224 can be communicatively coupled to DNNC component(s) 232 by way of residential building 226, factory 230, and electrical distribution grid equipment 222.

System 220 can forgo the cloud-computing environment of system 200. In an aspect, it may be advantageous to avoid implementing the cloud-computing environment, however, sufficient bandwidth for data access across the components of system 220 can be limiting. For example, there can be costs associated with implementing a cloud-computing environment, including connecting each component a system 200 to the cloud. While this can be avoided in system 220, there can be concerns with the bandwidth of the communicative couplings among the components of system 220. For example, powerline communication across electrical distribution grid equipment 222 can be in the kb/sec region, due to the lower frequency employed in power line communication, rather than a Mb/sec or Gb/sec as would be typical with broadband type cloud connections.

System 240 can comprise similar components to systems 200 and 220. For example, system 240 can include distributed generation resource 244, residential building 246, PEV 248, factory 250, electrical distribution grid equipment 242, and DNNC component(s) 252. However, in contrast to systems 200 and 220, system 240 can comprise direct communication between system 240 components. For example, residential building 246 can be communicatively coupled to DNNC components 252, factory 250 can be communicatively coupled to DNNC components 252, etc. In contrast to system 220, system 240 can experience less data access bottlenecking. For example, in system 220, accessing PEV 228 data can include a hop between DNNC component 232, electrical distribution grid equipment 222, factory 230, and a residential building 226. In contrast, for example, in system 240, accessing PEV 248 data includes only one hop between DNNC component 252 and PEV 248. System 240 can avoid use of cloud computing components in a manner similar to system 220, as compared to system 200.

In a further aspect, the connectivity schemes of system 200, 220, and 240, can be selectively combined in a hybrid scheme (not illustrated) or hybrid system (not illustrated). For example, certain components of a hybrid system, such as several residential buildings in a neighborhood, can be communicatively coupled by way of cloud computing component similar to cloud-computing component 202. Continuing the example, other components of the hybrid system, such as a factory and electrical distribution grid equipment can be communicatively coupled to DNNC component(s) similar to DNNC component 232, by way of daisy chain connectivity, similar to that shown in system 220. Moreover, other exemplary hybrid system components can be communicatively coupled to DNNC component(s) similar to DNNC component 252, by way of a direct connection similar to that illustrated in system 240. As such, benefits of each of the connectivity schemes illustrated in systems 200, 220, and 240 can be achieved and balanced against the drawbacks of each of the illustrated systems 200, 220, and 240. It will be readily apparent that a nearly limitless number of connectivity scheme permutations employing aspects of one or more of systems 200, 220, and 240, can be implemented, and all such hybrid schemes are to be considered within the scope of the present disclosure.

In an aspect, electrical distribution grid data and/or electrical distribution control system data can be accessed by various components of the electrical distribution control system. Access to this data can facilitate improved performance of the electrical distribution grid. Moreover, as electrical distribution grids become more computerized and generate increasing amounts of data, management of these large volumes of data becomes increasingly critical. As such, access to electrical distribution grid data and/or electrical distribution control system data can incorporate various techniques to reduce effective minimum bandwidth requirement to communicate such data across the electrical distribution control system. It will be appreciated that in a multi-level control environment distributed processing of data can result in control signals at one or more of the various levels of the control environment. This distributed processing of data can further reduce the overall bandwidth necessary in a modern electrical distribution control system. Furthermore, security features can be integrated into processed data to protect the data to improve the overall function and security of the electrical distribution control system. By increasing the security of the electrical distribution control system, it becomes apparent that the electrical distribution grid itself can be better protected. Various data access schemes can facilitate distribution of data throughout electrical distribution grid and/or electrical distribution control system. These can include cloud-based data systems, distributed databases, centralized databases, distributed processing in local storage, etc. Furthermore, data can be passed in electrical distribution control system as simple variables, variables with metadata, objects, written to databases, stored in lookup tables, as cargo in a wrapper, etc.

Figure 3:
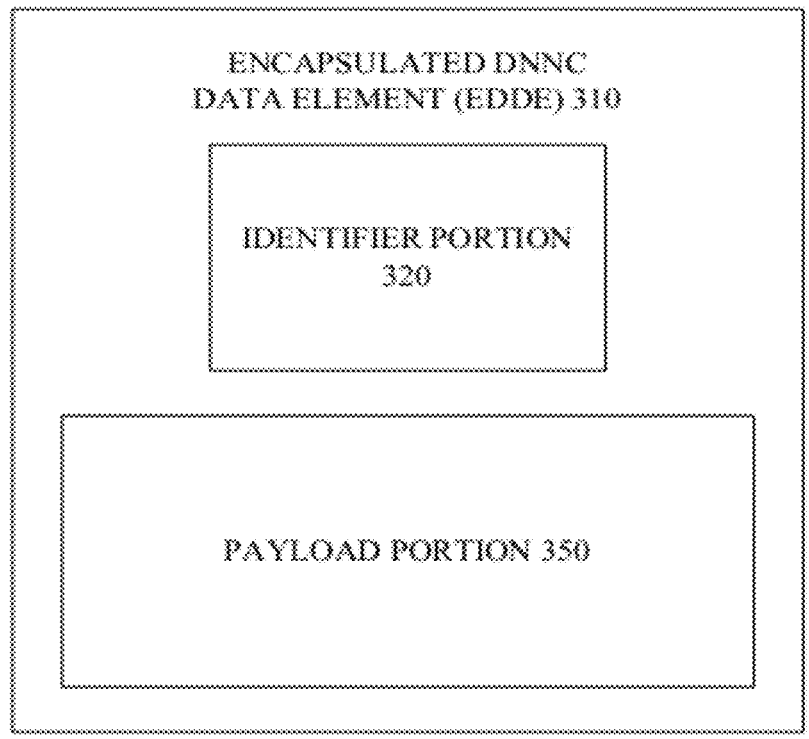
FIG. 3 is a block diagram illustrating an exemplary data element in accordance with aspects of the disclosed subject matter.

FIG. 3 is a block diagram illustrating an exemplary data element 310 in accordance with aspects of the disclosed subject matter. Encapsulated DNNC data element (EDDE) 310 can be one data transfer schema element. EDDE 310 can include an identifier portion 320 and a payload portion 350. In an embodiment, EDDE 310 can wrap raw data or DNNC data in payload portion 350. Identifier portion 320 can serve to identify aspects of the payload stored in payload portion 350. For example, an efficiency measurement can be 0.8. This efficiency measurement can be placed in an EDDE, such as EDDE 310. Identifier portion 320 can identify that the payload portion 350 contains an efficiency measurement. The payload portion 350 can include the value 0.8. As such, when EDDE 310 is accessed by other components of an electrical distribution control system, a simple interrogation of the EDDE 310 and identifier portion 320 will indicate that the payload portion contains an efficiency measurement. This can facilitate proper handling of the payload. As a non-limiting example, where a top-level DNNC component receives EDDE 310, identifier portion 320 can indicate an efficiency measurement, such that top-level DNNC component stores the value 0.8 retrieved from payload portion 350 in a register related to efficiency measurements.

In a further aspect, EDDE 310 can be a secure environment for transmitting data across the various components of an electrical distribution control system. By designating a specific format of encapsulation, electrical distribution control system can actively designate the proper format for data transmission across electrical distribution control system and can thus proactively provide for a more secure environment. Moreover, even where this format is open, secure identifiers integral to a secure EDDE can allow dynamic adaptation of security features, for example, pushing out updated secure codes to known systems components such that the secure codes allow access to EDDE that are contemporaneous with the updated secure code. Additionally, payload data stored in the payload portion 350 can itself be encrypted or further secured.

Identifier portion 320 can include various other identification information related to the payload data. In an embodiment, identifier portion 320 can include identifiers relating to electrical distribution control system models, information relating to a source of data, information relating to the time or environment of the data, and various reserve portions. As a non-limiting example, identifier portion 320 can indicate a timestamp, and identifier indicating that the data came from a bottom-level DNNC component, and identifier indicating that the data was captured under a geographical information system (GIS) model, that the data is stored in encapsulated format within the payload portion, that the data belongs to "Example Utility", and the data is highly compressed using compression model C. As such, when the identifier portion 320 of the example is accessed at any DNNC component within a multi-level electrical distribution control system, the identifier portion 320 can provide basic information regarding the handling of the data within the payload portion, such as when and where the data came from and how it should be decompressed, etc.

Payload portion 350 can include information relating to data stored therein. This information can include the size of the payload, a unique identifier of the payload, payload typing and values, etc. Moreover, payload portion can include values, functions, expressions, or other iterations of encapsulated DNNC data elements. As a non-limiting example, a payload portion 350 can include a payload size portion indicating 16-bits of data, a blank identifier portion, the payload type can designate two doubles, i.e., two 8-bit values, and the payload value portion can include a 16-bit value "0101010111001100".

More complex non-limiting examples of payloads stored within a payload portion of an EDDE are readily appreciated. For example, payload portion 350 can include large quantities of data, e.g., kilobytes, megabytes, gigabytes, etc., which can comprise one or more individual measurements or data elements, such as, a series of voltage measurements, a series thermal measurements, average values over time, measurements of a profile that can include multiple types of data, such as, a profile indicating voltage, current, temperature, time, whether, location, charging status, etc. As a second example, payload portion 350 can include functional code payloads, such as, a payload including a formula for averaging values, a pricing formula, calibration formulas, code embodying rules or logic, etc. As a third example, payload portion 350 can include additional iterations of EDDE's, such as a first EDDE payload comprising a second EDDE payload containing temperature data.

EDDE 310 can facilitate effective and efficient sorting of data transmissions with an electrical distribution control system. In an aspect, identifier portion 320 of EDDE 310 can be used to rapidly route EDDE 310 to a desired DNNC component location. For example, a bottom-level DNNC component can facilitate access to an EDDE having identifier portion designating the payload portion contains information relevant only to a top-level DNNC component. As such, as the exemplary EDDE passes through the various DNNC components of an electrical distribution control system, including one or more mid-level DNNC components, as each DNNC component interrogates the identifier portion of the EDDE, it can be recognized that the data contained the payload portion is irrelevant. This can prevent further processing of the EDDE at each of the mid-level DNNC components. When EDDE arise up to top-level DNNC component interrogation of the identifier portion will indicate the payload portion contains information relevant to the top-level DNNC component and further processing of EDDE can occur at the top-level DNNC component.

In another aspect, EDDE 310 can facilitate effective and efficient sorting of data transmissions with an electrical distribution control system by facilitating target relevant compression or agglomeration of data. For example, where a bottom-level DNNC components aggregate electrical consumption data for large residential areas, this data can be processed at the bottom-level DNNC components to provide trending data, said trending data can then be compressed, and package the payload portion of an EDDE. This EDDE can be transmitted to the mid-level DNNC components that can strip the compressed payload portion of the EDDE received from each bottom-level DNNC component. These several payload portions can then be combined with a single payload portion of the mid-level EDDE that can then be transmitted to a top-level DNNC component. As such, the top-level DNNC component receives a single payload portion from a mid-level DNNC component containing a plurality payload portion iterations from bottom-level DNNC components wherein each of the individual payload portions of the bottom-level DNNC components reflects process data is then compressed to save space and be transmitted more efficiently.

Figure 4:
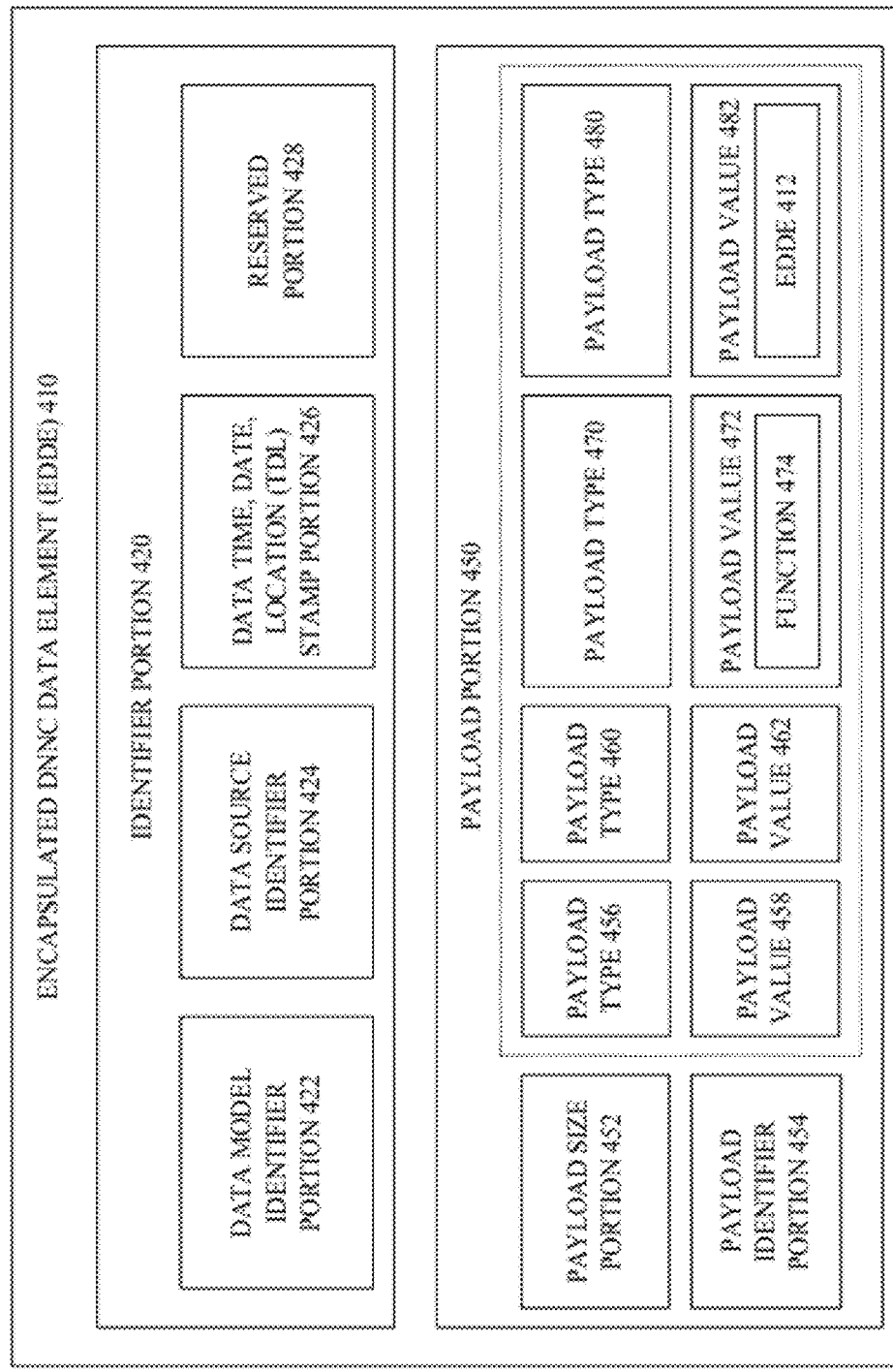
FIG. 4 illustrates a block diagram of a non-limiting exemplary data element in accordance with aspects of the disclosed subject matter.

FIG. 4 illustrates a block diagram of a non-limiting exemplary data element 410 in accordance with aspects of the disclosed subject matter. EDDE 410 can be the same as, or similar to, EDDE 310. EDDE 410 can include identifier portion 420 and payload portion 450. Identifier portion 420 can further include data model identifier portion 422, data source identifier portion 424, data time/date/location (TDL) stamp portion 426, or reserve portion 428. Data model identifier portion 422 can designate data model identifier information related to data in the payload portion 450, such as, an indicator identifying a pricing model in force when the payload data was captured, a GIS data model in force in the payload data was captured, energy sharing model in force when the payload data was captured, etc. Data source identifier portion 424 can identify a source of the data, for example, that data in the payload portion was captured at a transformer, a smart meter, a subscriber equipment, a substation, a weather station, a high-voltage conductor, etc. Data time/date/location stamp portion 426 can identify time, date, or location information related to data in the payload portion. Reserve portion 428 can be included within identifier portion 420 for future expansion, metadata storage area, or EDDE proprietary information.

Payload portion 450 can include payload size portion 452. Payload size portion 452 can designate the total size of payload portion 450 or sub-portions thereof. For example, payload size portion 452 can indicate that payload portion 450 is 1024-bits. As such, any electrical distribution control system component interrogating payload portion 450 can readily determine that 1024-bits of space can be set aside for storage of the payload held in payload portion 450.

Payload portion 450 can further include payload identifier portion 454. Payload identifier portion 454 can include an identifier related to the payload. In an aspect, the identifier included in payload identifier portion 454 can be unique identifier. As such, the payload held in payload portion 450 can be identified, or uniquely identified, by payload identifier portion 454. For example, payload identifier portion 454 can include a unique identifier identifying billing information contained within payload portion 450. As such, any reference to this unique identifier can feasibly be traced back to the payload contained within payload portion 450. As a second example, a non-unique identifier can be contained within payload identifier portion 454, such that, a specific type of payload that is regularly used within an electrical distribution control system can be rapidly identified. For example, hourly health check data for electrical distribution grid equipment can be designated by an identifier, such that when the identifier is read, the system can be prepared to receive hourly health check data.

Payload portion 450 can additionally comprise payload type 456 and payload value 458. In an aspect, payload type and payload value can be linked. For example, payload type 456 can indicate an int, char, long, double, etc., whereas payload value 458 can indicate the value of the int, char, long, double, etc., indicated by payload type 456. Payload type 460, payload type 470, and payload type 480, can be the same as, or similar to, payload type 456. Moreover, payload types can include typing of any payload value. For example, when the payload value is a function the payload type can indicate function. As a second example, where the payload value is an object the payload type can designate an object. Similarly, payload value 462, payload value 472, and payload value 482 can be the same as, or similar to payload value 458. It will be appreciated that payload value can be one or more values, code, functions, tables, references, EDDE's, or any other type of data. Moreover, payload values can be related to the designated payload types. For example, payload type 470 can indicate a "function" payload type. Related payload value 472 can have the value function 474. That is, the value of the payload 472 is the function 474. As a second example, payload type 480 can designate an EDDE instance. Related payload value 482 can have the value EDDE 412. That is, the value of payload 482 is EDDE 412. As a third example, payload type 460 can indicate the location of a database, such that, related payload value 462 is the reference to the location database.

Figure 5:
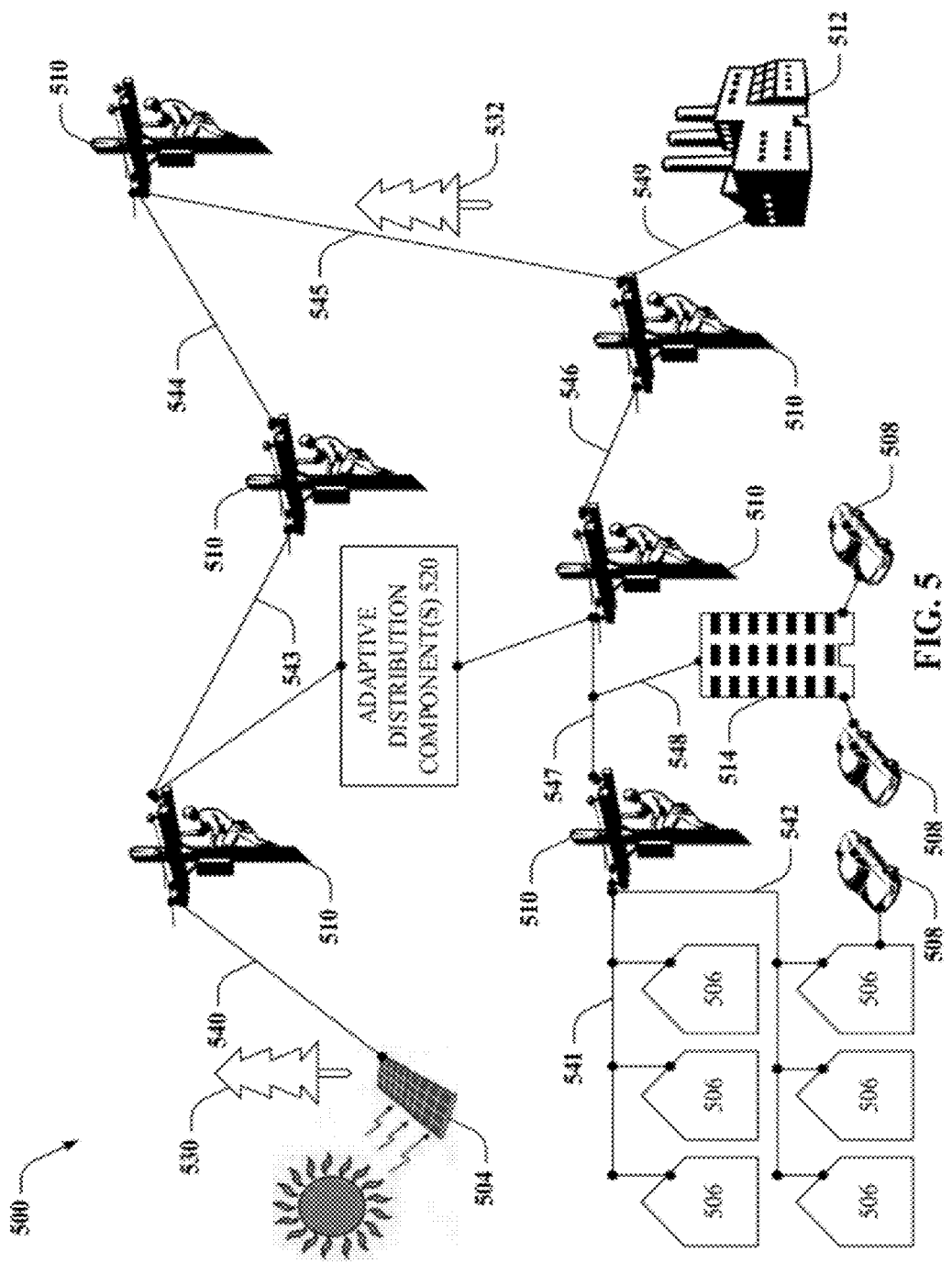
FIG. 5 is a graphic illustration of a non-limiting exemplary model of a portion of an electrical distribution system in accordance with aspects of the disclosed subject matter.

FIG. 5 is a graphic illustration of a non-limiting exemplary model 500 of a potion of an electrical distribution system in accordance with aspects of the disclosed subject matter. In an aspect, model 500 can represent a geographic information system (GIS) model. As such, each component of model 500 we associated with a geographic location. The geographic location can be time dependent. For example, PEV 508 can be part different locations and therefore be associated different geographic locations at different times. Model 500 can include various components, including distributed generation source 504, residential housing units 506, PEV's 508, office building 514, electrical distribution grid equipment 510, factory 512, tree 530 and tree 532, etc. Model 500 can also include interfaces with electrical distribution control systems, for example, adaptive distribution component(s) 520.

Distributed generation component 504 can generate electricity to be distributed to other components of an electrical distribution grid. For example, distributed generation component 504 can be a solar panel and energy can be generated when sunlight falls on the solar panel. Less energy can be generated when less sunlight falls on the solar panel. As such, the proximate location of tree 530 to solar panel 504 can be of concern to an electrical distribution utility. Thus, for example, at certain times of the day tree 530 can shade solar panel 504. Tree 530 can be included in a GIS model of the electrical distribution grid such that the temporal variance of electrical energy generated by solar panel 504 can be correlated with the position of the sun in relation to tree 530 and solar panel 504. Additional correlations can be drawn to time variant electrical energy generation by solar panel 504 as a function of weather in the geographic location associated with solar panel 504. As such, the example of geographic location of solar panel 504 and the geographic location of tree 530 can illustrate predictive data relating to future energy generation from solar panel 504 as a function of both time, e.g., the location of the sun in relation to tree 530, and local weather. This predictive data can be incorporated into advanced models relating to energy distribution in the region.

Electrical conductors 540-548, can conduct energy across a portion of the electrical distribution grid. Sensors can be included on these electrical conductors, for example, to detect the health condition of the electrical conductors, physical characteristics of the electrical conductors, environment of electrical conductors, etc. Moreover, GIS location information can be stored for each of conductors 540-548. For example, where electrical conductor 543 is damaged, a sensor can relay data indicating the damage to the conductor. In response to the detected damage to conductor 543, a repair crew can be notified, and adaptive distribution component 520 can be activated to provide an additional conductive pathway and relieve any strain on electrical conductor 543. The second example the location of tree 532 can be stored in the GIS model. Where tree 532 is located close to conductor 545, a value in the GIS model can designate conductor 545 at the location of tree 532 as a weather sensitive conductor. Thus, where heavy weather is predicted in the location of tree 532, repair crews can be sent to the location before the weather arrives to ensure that dangerous lands on tree 532 are pruned back to minimize potential damage to conductor 545 during the upcoming weather event.

In an aspect, sensor equipment located throughout the electrical distribution grid represented by model 500 can provide important additional information and data relating to the consumption of energy and the condition of the system. For example, conductors 541 and 542 can be equipped with sensors that convey voltage, current, and temperature information back to electrical distribution control system. Knowing the location of conductor 541 and the values of the voltage, current, and temperature for conductor 541 can facilitate determinations of power consumption for the residential housing units 506 serviced by conductor 541. Similarly, knowing the location of conductor 542 can allow computation of the electrical energy consumption of residential housing units 506 serviced electrical conductor 542. This type of information can be employed by a utility operating the electrical grid represented by model 500. For example, energy consumption at conductors 541 and 542 can be employed in pricing models, sharing models, repair models, growth models, and general consumption models, etc. Further, energy consumption at conductors 541 and 542 can be correlated with other regional data, such as, weather, activities, incentive programs, etc. This correlation can lead to further information regarding energy consumption energy consumption trends they can be valuable to utility operating electrical distribution grid represented by model 500.

Figure 6:
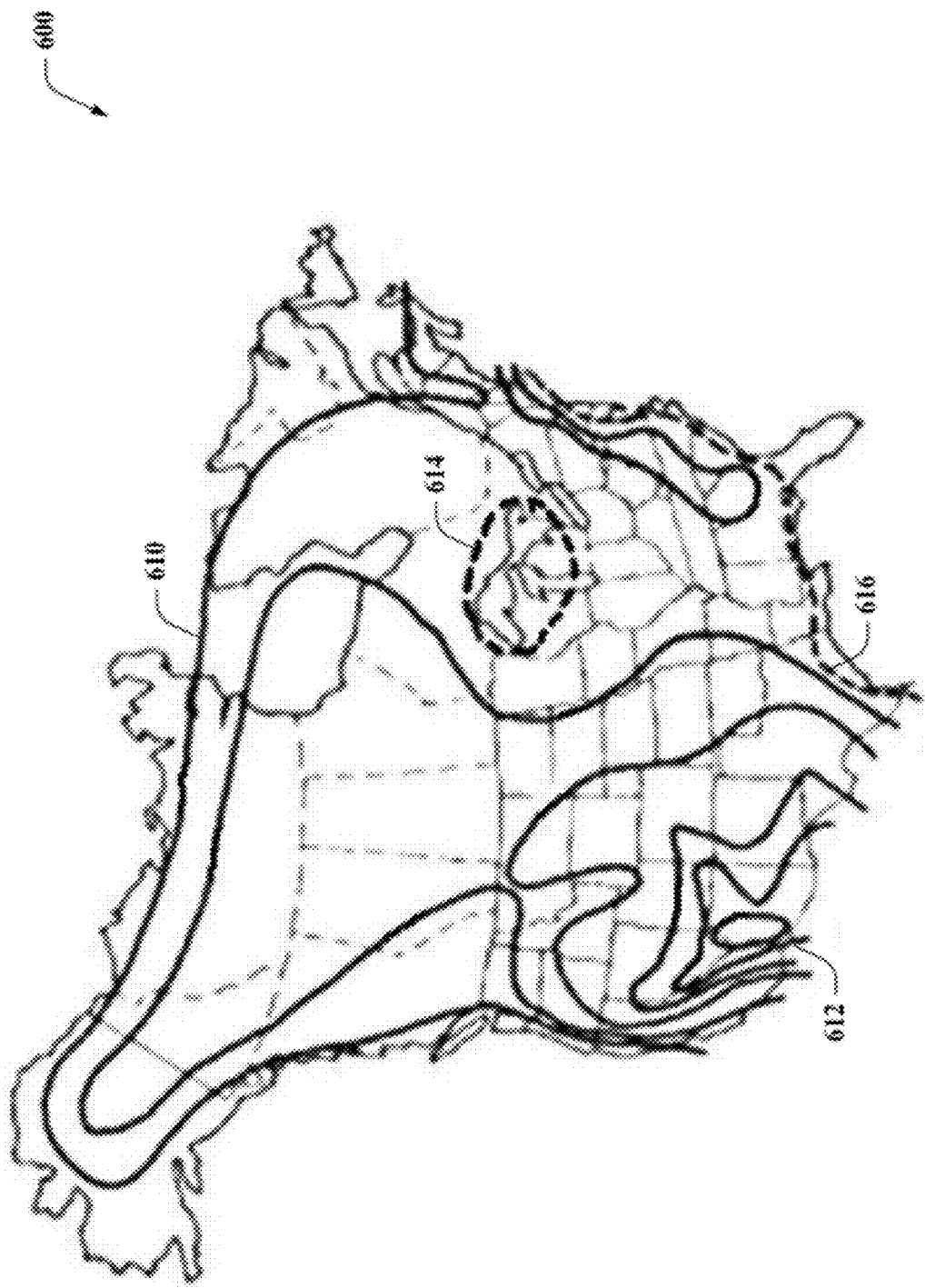
FIG. 6 is a graphic illustration of a non-limiting exemplary model of a portion of an electrical distribution system in accordance with aspects of the disclosed subject matter.

FIG. 6 is a graphic illustration of a non-limiting exemplary model 600 of a potion of an electrical distribution system in accordance with aspects of the disclosed subject matter. Model 600 can be related to model 500. For example, model 600 can be a graphical representation of types of data collected in relation to electrical distribution grid represented by model 500 of FIG. 5. In an aspect, model 600 can represent data from various small utilities stitched together into a larger energy.

Model 600 can provide important information to electrical utilities on a local, regional, national, or even global level. For example, model 600 can represent energy consumption trends in the US and Canada. As such, line 610-616 can represent various parameters, for example, various levels of energy consumption. Moreover, overlaying other geographic data with various parameters represented in model 600 can provide further insight into energy-related phenomena. As a non-limiting example, weather patterns can be correlated against energy usage to provide trend data as to when electrical consumption rises in relation to whether, such as, at what temperature people turn on heating or air conditioning systems, under what conditions electrical system equipment functions less efficiently, have future weather patterns can influence electrical transmission grid planning, etc.

Figure 7:
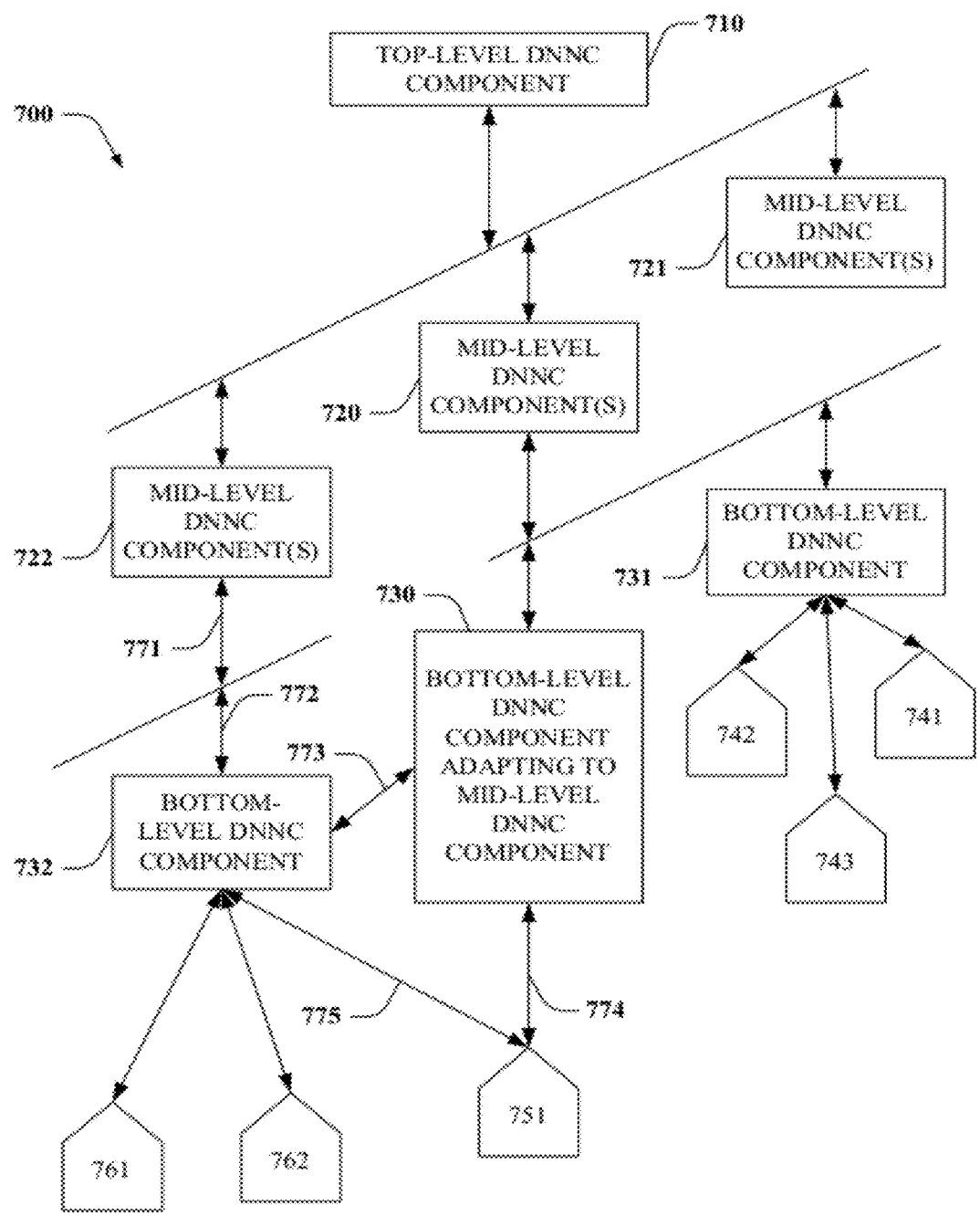
FIG. 7 illustrates a block diagram of an exemplary system comprising a hierarchical control topography for an electrical distribution network that can be dynamically reconfigured in accordance with aspects of the disclosed subject matter.

FIG. 7 illustrates a block diagram of an exemplary system 700 comprising hierarchical control topography for an electrical distribution network that can be dynamically reconfigured in accordance with aspects of the disclosed subject matter. System 700 can comprise a top global DNNC component 710, which can be communicatively coupled to mid-level DNNC components 720, 721, and 722. Mid-level DNNC component 720 can further be communicatively coupled to bottom-level DNNC component 730 and bottom-level DNNC component 731. Mid-level DNNC component 722 can be communicatively coupled to bottom-level DNNC component 732. Bottom-level DNNC component 731 can be communicatively coupled to subscriber 741, 742, and 743. Bottom-level DNNC component 730 can be communicatively coupled to subscriber 751. Bottom-level DNNC component 732 can be communicatively coupled to subscriber 761 and subscriber 762.

In an aspect, the topography of system 700 can be dynamically reconfigured. System 700 can be dynamically reconfigured based on conditions within the electrical distribution control system. In an aspect, these conditions can be related to electrical distribution grid conditions. For example, a control link, such as 771, can be related to both the electrical distribution control system and/or electrical distribution grid. Thus, where control link 771 can be, for example, an electrical energy conductor that also carries control signals by way of powerline signaling, damage to the electrical energy conductor can also inhibit effective control signaling. As such, reconfiguration of the electrical distribution grid and/or the electrical distribution control system can be desirable.

Continuing the previous example, where control link 771 can be functioning below expectations, system 700 can be dynamically reconfigured. One possible reconfiguration can be as follows, subscriber 751 communicatively coupled to bottom-level DNNC component 730 by controlling 774 can be shifted to bottom-level DNNC component 732 by establishing control link 775 and terminating control link 774. Further, controlling 773 can be established between bottom-level DNNC component 732 and bottom-level DNNC component 730. Whereas bottom-level DNNC component 730 is no longer connected to any bottom-level subscriber components, and sits between mid-level DNNC component 720 of bottom-level DNNC component 732, bottom-level DNNC component 730 can now be considered adapted to be a mid-level DNNC component 730. Moreover, whereas bottom-level DNNC component 732 can now be communicatively coupled to mid-level DNNC component 730 by control link 773, controlling 772 can be terminated. Whereas control link 772 has been terminated, control link 771 can be irrelevant and can be terminated. As such, reconfigured system 700 in part comprises orphaned mid-level DNNC component 772, mid-level DNNC component 720 communicatively coupled to mid-level DNNC component 730, which is further communicatively coupled to bottom-level DNNC component 732. In turn, bottom-level DNNC component 732 is now communicatively coupled to subscriber 751, subscriber 761, and subscriber 762.

It will be appreciated that the reconfiguration of an electrical distribution control system can be based on various sources of information. As such dynamic reconfiguration of electrical distribution control system, such as system 700, can be based on indicated changes within the electrical distribution control system, indicated changes based, at least in part, on the electrical distribution grid, information related to electrical transmission, information related to electrical subscriber(s), predictive data, historical data, etc. For example, a sensor and electrical grid component, such as a distribution transformer, can indicate failure of the electrical grid component. In response, electrical distribution control system can initiate dynamic reconfiguration of either the electrical distribution control system or the electrical distribution grid.

Figure 8:
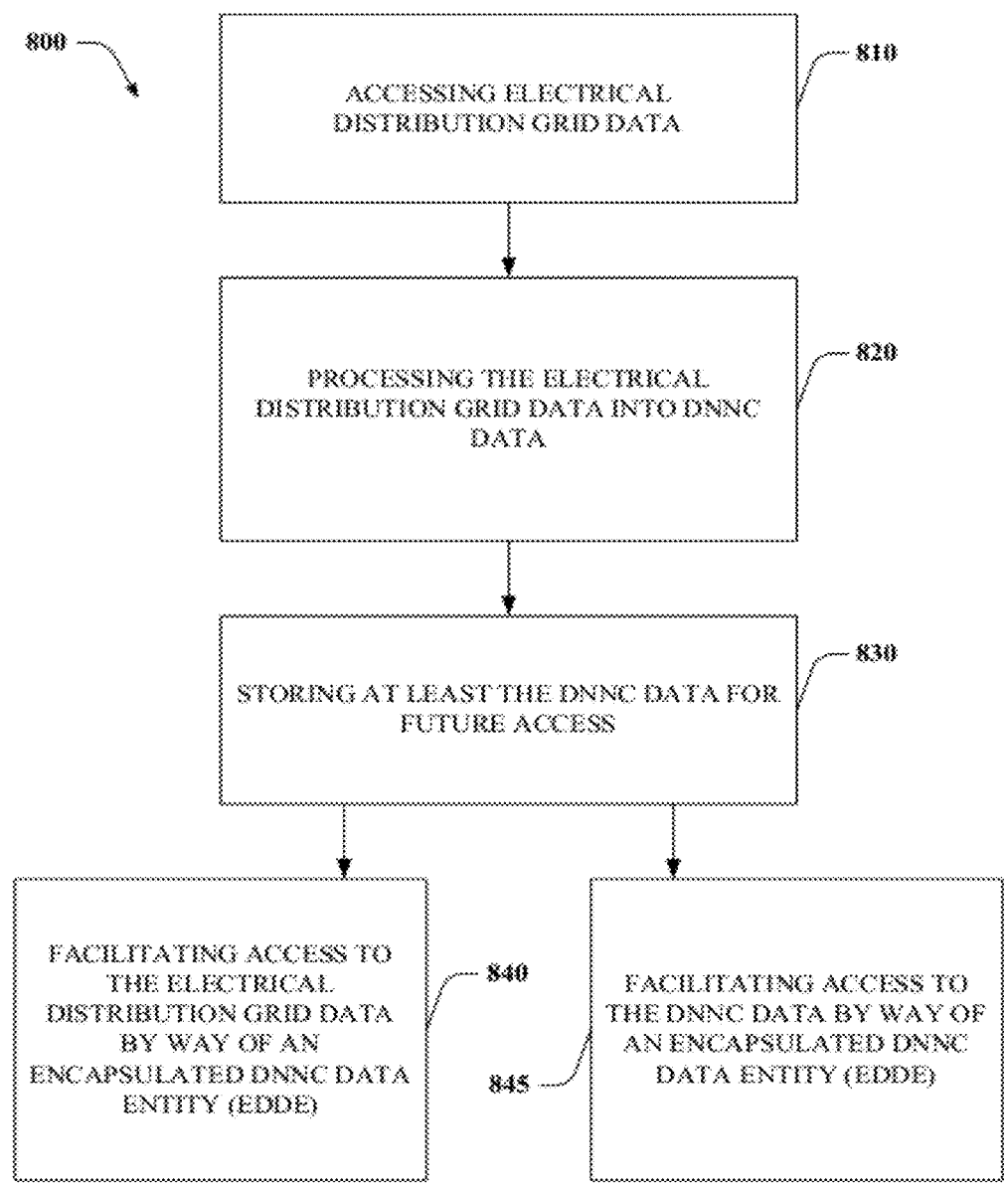
FIG. 8 is an exemplary flowchart of procedures for a method for electrical distribution grid data processing in accordance with aspects of the disclosed subject matter.
Figure 9:
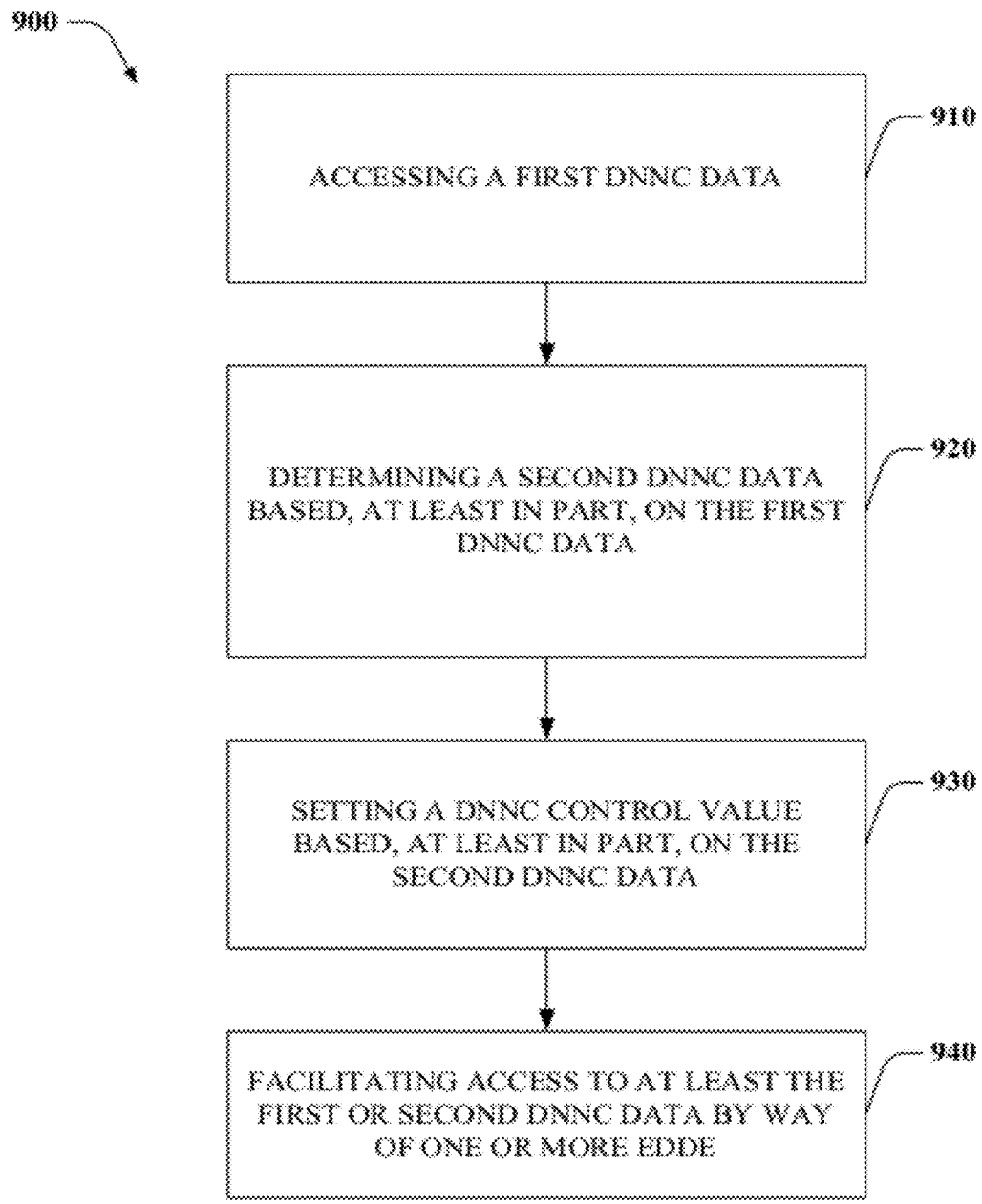
FIG. 9 illustrates a flowchart of procedures of a method facilitating setting control values based on distribution network control node (DNNC) data in accordance with aspects of the disclosed subject matter.
Figure 10:
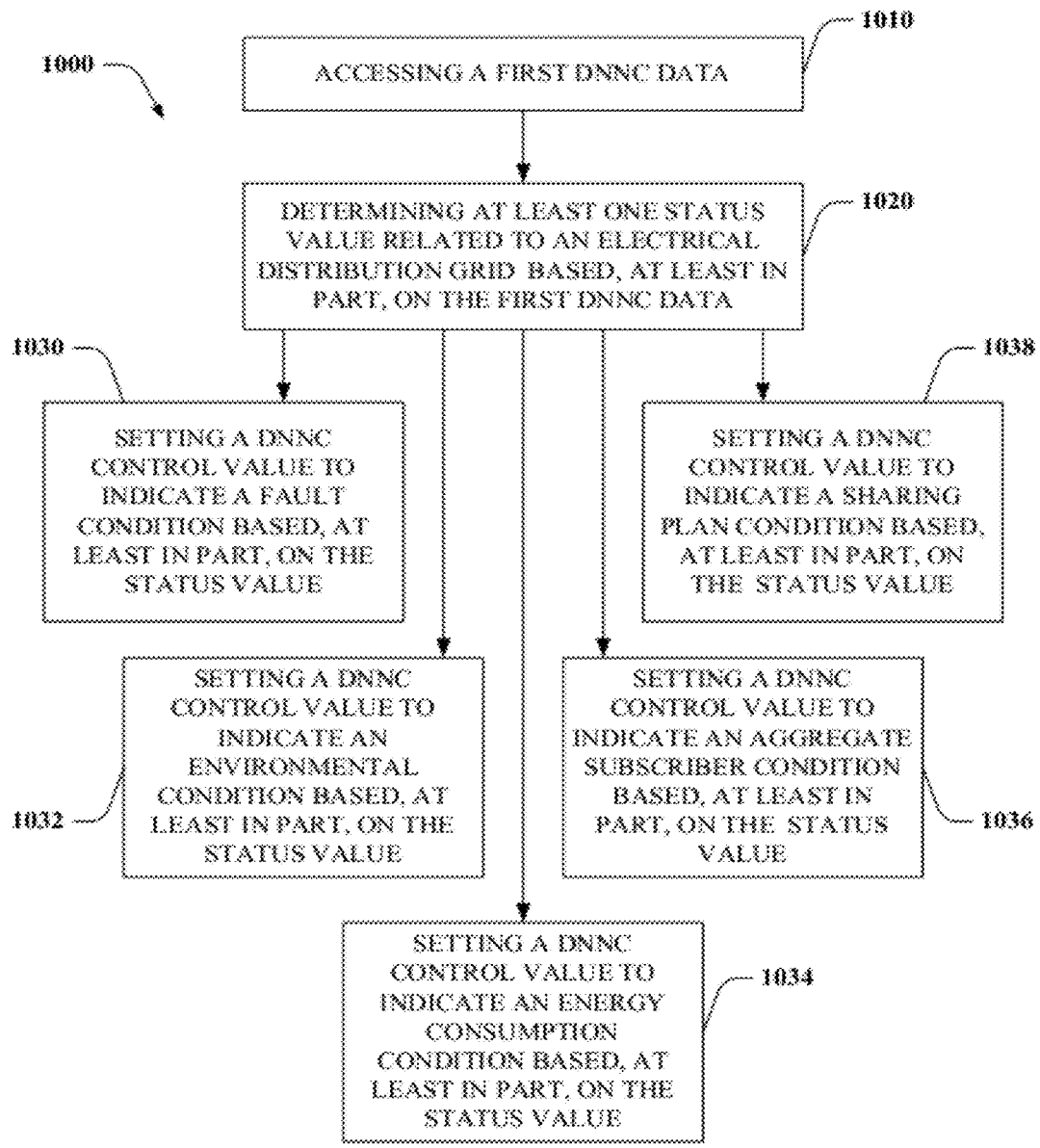
FIG. 10 illustrates a flowchart of procedures from a method facilitating hierarchical control in an electrical distribution network in accordance with aspects of the disclosed subject matter.

In view of the example system(s) described above, example method(s) that can be implemented in accordance with the disclosed subject matter can be better appreciated with reference to flowcharts in FIG. 8 to FIG. 10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

FIG. 8 is exemplary flowchart of procedures defining a method 800 for electrical distribution grid data processing in accordance with aspects of the disclosed subject matter. At 810, method 800 can access electrical distribution grid data. In an aspect, electrical distribution grid data can comprise measurement data and other information related to the electrical distribution grid. For example, electrical distribution grid data can include voltage, current, phase, temperature, resistance, fault data, efficiency data, etc.

At 820, electrical distribution grid data can be processed into DNNC data. DNNC data, as discussed herein above, can be the same as, or similar to, electrical distribution grid data. Further, DNNC data can be related to electrical distribution grid data and/or can be related to electrical distribution control system data. For example, electrical distribution grid data, such as a fault condition, can be converted to DNNC data indicating a fault condition. As a second example, electrical distribution grid data, such as voltage level, can be processed into DNNC data representing an average voltage level. As a third example, a DNNC data can represent a control value in an electrical distribution control system. At 830, the DNNC data can be stored for future access. At this point method 800 can end.

In an aspect, at 840, access to the electrical distribution grid data from 810 can be facilitated by way of an encapsulated DNNC data entity. Similarly, at 845, access to the DNNC data from 820 can be facilitated by way of an encapsulated DNNC data entity. Encapsulated DNNC data entities can be the same as, or similar to, EDDE's discussed herein above. For example, where electrical distribution grid data at 810 indicates a fault in a distribution transformer, this fall data can be converted into DNNC data indicating a fault at 820. Continuing the example, this DNNC data indicating a fault an electrical distribution grid can be stored at 830 per future access. Further, at 840, the original fault data from the electrical distribution grid can be accessed by way of an EDDE. Moreover, at 845 the stored DNNC data indicating a fault electrical distribution grid can be accessed by way of an EDDE.

Method 800, in an aspect, provides for the conversion of raw electrical distribution grid data into DNNC data they can be readily and efficiently accessed across electrical distribution control system. Further, method 800 facilitates access to electrical distribution control system data in the form of DNNC data. Method 800 further provides for access to the raw electrical distribution grid data and the various forms of DNNC data by way of EDDE's. As disclosed hereinabove, EDDE's can provide features that are desirable an electrical distribution control system, such as, access to various types of data, functions, models, and complex data sets, in a secure and efficient manner.

FIG. 9 is an exemplary flowchart of procedures defining a method 900 facilitating setting control values based on distribution network control node (DNNC) data in accordance with aspects of the disclosed subject matter. At 910, method 900 can access the first DNNC data. DNNC data can be the same as, or similar to, DNNC data as described elsewhere herein. At 720, a second DNNC data can be determined based, at least in part, on the first DNNC data. In an aspect, this can represent higher order manipulation of low order DNNC data. For example, a first DNNC data can represent a set of voltage measurements over a period of time. Continuing the example, a second DNNC data based on the first DNNC data can be time average voltage level.

At 930, a DNNC control value can be set based, at least in part, on the second DNNC data value. At this point method 900 can end. For example, when the second DNNC data value is a time average voltage level that exceeds a predetermined threshold, a DNNC control value can be set to lower the voltage applied at the related node of the electrical distribution grid. In an aspect, at 940, access to at least the first or second DNNC data can be facilitated by way of an EDDE.

Method 900, in an aspect, provides manipulation of DNNC data into other forms represented as further DNNC data. This can easily be visualized in a distributed computing environment such as a multi-level hierarchical electrical distribution control system. In a multi-level hierarchical electrical distribution control system DNNC data can represent both electrical distribution grid measurements and information as well as control system data. Moreover, manipulation of the DNNC data can be accomplished by data processing with the results being stored as further DNNC data. This further DNNC data can then be employed but electrical distribution control system for improved efficiency, reliability, and security. In an aspect, manipulation of low level DNNC data entire order process DNNC data can represent compression of low level data, such as, analyzing large sets of measurement data to produce single variables representing average values, curve fitting, trending data, etc. These higher-order DNNC data can be more easily and efficiently communicated across the electrical distribution control system as compared to large volumes of low-level DNNC data. For example, it can be much more efficient to communicate an average voltage level that can communicate many voltage level measurements.

FIG. 10 illustrates a flowchart of procedures from a method 1000 facilitating hierarchical control in an electrical distribution network in accordance with aspects of the disclosed subject matter. At 1010, method 1000 can access the first DNNC data. DNNC data can be the same as, or similar to, other DNNC data as disclosed herein. At 1020, at least one status value related to an electrical distribution grid can be determined based, at least in part, on the first DNNC data from 1010. For example, a fault an electrical distribution grid can be related to a low voltage level and the first DNNC data. Based on this low voltage level indicated by the first DNNC data default can be determined, and a fault status can be set.

Based at least in part on the status value at 1020, the DNNC control value can be set as indicated at 1030-1038. At this point method 1000 can. At 1030, the DNNC control value can be set to indicate a fault condition based, at least in part, on the status value from 1020. At 1032, the DNNC control value can be set to indicate an environmental condition based, at least in part, on the status value at 1020. At 1034, the DNNC control value can be set indicated energy consumption condition based, at least in part on the status value from 1020. At 1036, the DNNC control value can be set to indicate an aggregate subscriber condition based, at least in part on the status value of 1020. At 1038, DNNC control value can be set indicating a sharing plan condition based, at least in part on the status value from 1020.

In an aspect, method 1000 facilitates interaction with the electrical distribution grid by accessing DNNC data, determining status values, and setting DNNC control values such that access to these DNNC control values can affect the performance or topography of an electrical distribution grid. For example, the first DNNC data can be aggregated energy consumption data for a subscriber. This data can be accessed at 1010. At 1020, an anticipated energy consumption level for the subscriber, by way of electrical distribution grid, can be determined. At 1038, based on anticipated energy consumption level, e.g., the status value, a DNNC control value can be set to indicate sharing plan condition, for example, where the subscriber uses little energy and has a solar panel, the subscriber can sell energy back on to the electrical distribution grid to be shared with other subscribers. Numerous other examples employing DNNC data to control aspects of the electrical distribution control system by way of sending DNNC control value will be readily appreciated and all such other examples are to be considered within the scope of the presently disclosed subject matter.

Figure 11:
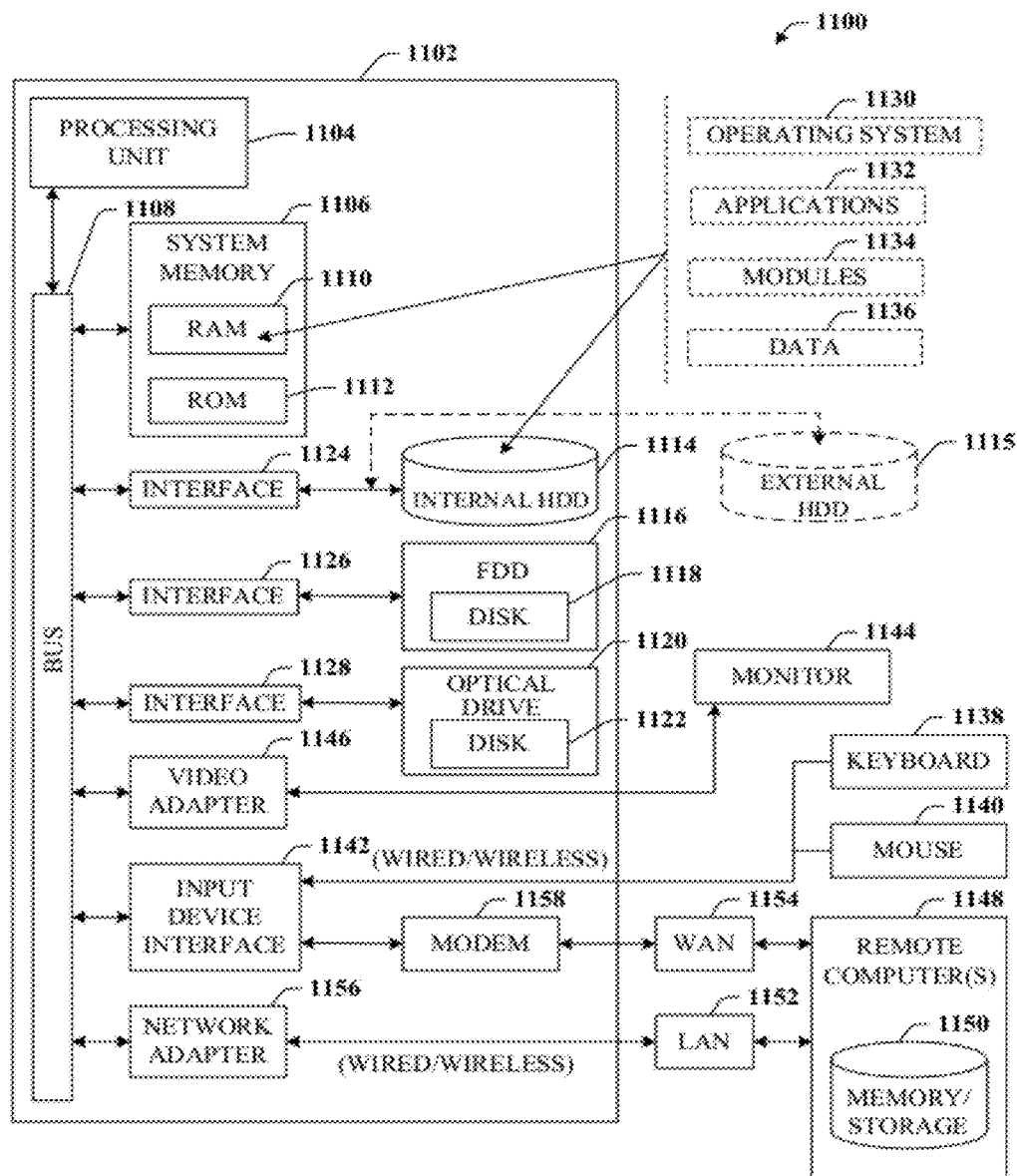
FIG. 11 illustrates a block diagram of a computer operable to execute a portion of the disclosed subject matter.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices. As non-limiting examples, electrical distribution system rules can be accessible by way of the World Wide Web (Web), on corporate servers, on the DNNC components (e.g., 120, 130, 214, etc.)

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the exemplary environment 1100 for implementing various aspects of the disclosed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114, e.g., EIDE, SATA, which internal hard disk drive 1114 may also be configured for external use in a suitable chassis, e.g., 1115, a magnetic floppy disk drive (FDD) 1116, e.g., to read from or write to a removable diskette 1118, and an optical disk drive 1120, e.g., reading a CD-ROM disk 1122 or, to read from or write to other high capacity optical media such as the DVD. The hard disk drive 1114 (or 1115), magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. For example, powerline type communications can allow control nodes of an electrical distribution system to share information. As a second example, cellular type communications can be employed, e.g., as a wireless communications modality disclosed hereinabove. The remote computer(s) 1148 can be a workstation, a server computer, a router, a personal computer, a mobile device, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, e.g., a kiosk, news stand, restroom, etc., and telephone. This includes at least Wi-Fi and Bluetooth™ wireless technologies. Thus, the communication can be a predefined structure as with a conventional network or simply an ad hoc communication between at least two devices.

Figure 12:
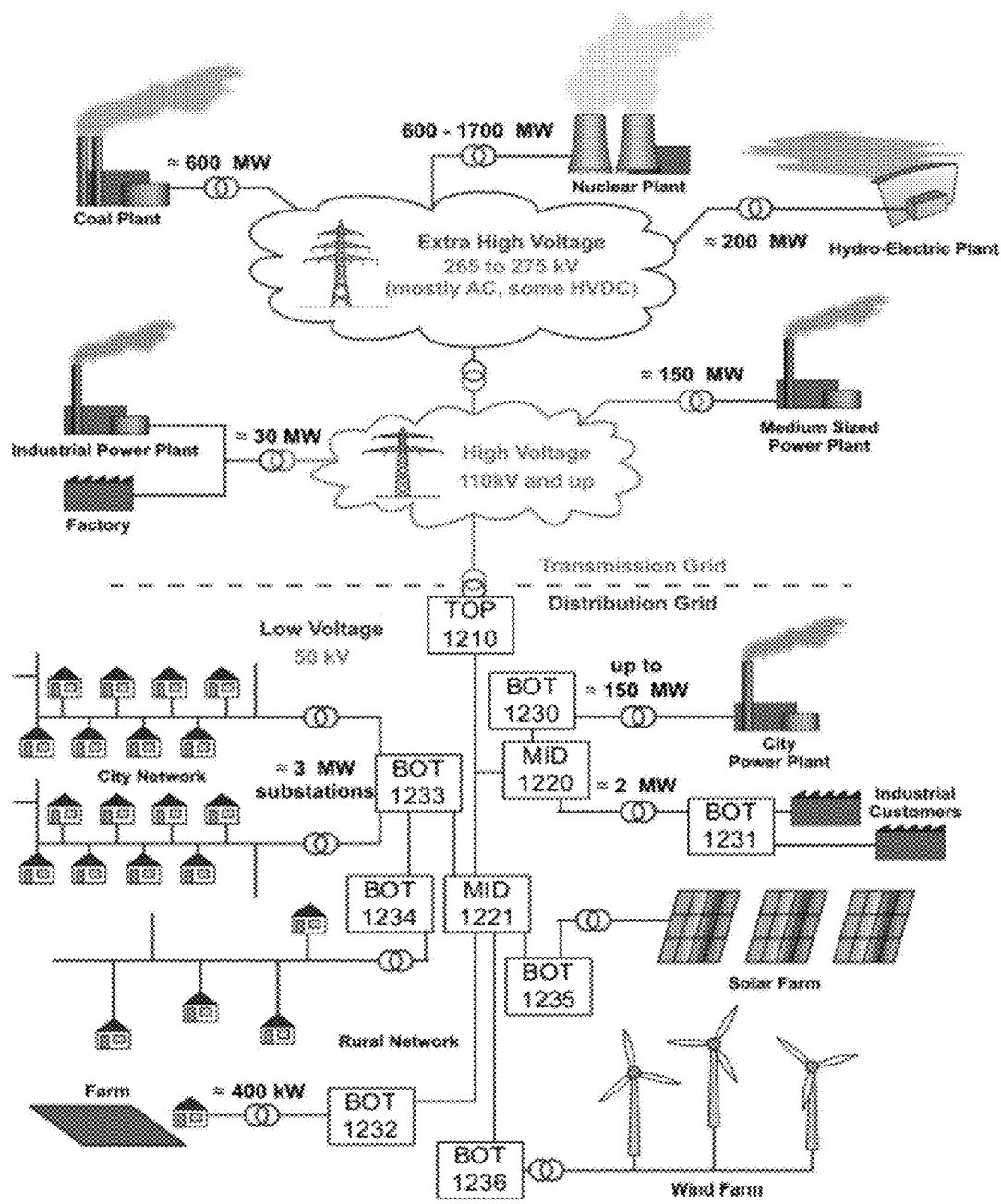
FIG. 12 is a representation of an exemplary electrical grid environment in which the various aspects of the disclosed subject matter can be practiced.

FIG. 12 is a representation of an exemplary electrical grid environment in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 12 can be assigned to a transmission grid portion (upper portion of figure) or a distribution grid portion (lower portion of figure) as is typical in many electrical grids worldwide. Transmission systems often are associated with very high AC voltages or even DC transmission of power. Transmission systems are generally presented in the context of delivering high power to regional distribution networks managed by a distribution grid entity.

The conventional electrical distribution grid generally has a flat control structure with control being centralized in a distribution control center (DCC). In contrast, as illustrated in FIG. 12, a non-flat control topography can be employed in accord with the subject matter disclosed herein. In this non-limiting example, three tiers of electrical distribution control system components are illustrated. A top-level DNNC component 1210 can be communicatively coupled to junior level DNNC components (e.g., 1220 to 1236). In FIG. 12, the interconnections illustrate a basic tree structure topology.

In an aspect, two mid-level DNNC components 1220 and 1221 are logically placed between the bottom-level DNNC components and the top-level DNNC component 1210. Further, the several bottom-level DNNC components (e.g., 1230 to 1236) can be associated with various edge assets. For example, bottom-level DNNC component 1230 can be associated with a city power plant and bottom-level DNNC component 1231 can be associated with a small group of industrial customers. Bottom-level DNNC component 1230 and 1231 can be logically connected to top-level DNNC component 1210 by way of mid-level DNNC component 1220. As such, data and rules can be bubble up or pushed down by way of this path. The bidirectional communication and closed loop control at each level (e.g., top, mid, and bottom) can facilitate improved electrical distribution grid performance. For example, where additional power is needed by the industrial customers associated with bottom-level DNNC component 1231, control signals from mid-level DNNC component 1220 can source more power from city power plant by way of bottom-level DNNC component 1230 without directly involving the top-level DNNC component 1210 or draining energy from the illustrated solar farm or wind farm.

Similarly, mid-level DNNC component 1221 can be associated with bottom-level DNNC components 1232 to 1236. Bottom-level DNNC component 1233 for example can be logically associated with a plurality of transformers service a portion of a city network. Further, for example, bottom-level DNNC component 1234 can be associated with a single transformer as part of a rural network. Moreover, at bottom-level DNNC component 1232, for example, the DNNC component can be associated with a single consumer such as the farm. DNNC components can also be associated with distributed power generation, for example bottom-level DNNC component 1235 associated with a solar farm and bottom-level DNNC component 1236 associated with a wind farm. As such, bidirectional communication between top-level DNNC component 1210 and bottom-level DNNC components 1232-1236 can be by way of mid-level DNNC component 1221. As such, rules propagated for mid-level DNNC component 1220 and associate child DNNC components can be different from rules propagated for mid-level DNNC component 1221 and associated child DNNC components. Further, independent closed loop control can be effected, for example, at bottom-level DNNC component 1234 and the associated rural customers without impacting bottom-level DNNC component 1233 and the associated city network.

As used herein, the term "communicatively" coupled or similar terms indicates that the coupling can at least support communication between components while the term "energetically" connected or similar terms indicates that the connection can at least support energy transfer between components. As such, an energetic connection is not strictly limited to energy transfer, unless otherwise indicated. An energetic connection can therefore also have a communicative aspect. As a non-limiting example, electrical energy can be transferred from a distribution transformer to a smart meter by way of mains conductors and information can be carried over the same mains conductors, e.g., power line communication.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets, e.g., data from one component interacting with another component in a local system, distributed system, and/or across a network such as the Internet with other systems via the signal. As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence, e.g., a capacity to make inference based on complex mathematical formalisms, which can provide simulated vision, sound recognition and so forth.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices, e.g., hard disk, floppy disk, magnetic strips, etc., optical disks, e.g., compact disc (CD), digital versatile disc (DVD), blu-ray disc (BD), etc., smart cards, and flash memory devices, e.g., card, stick, key drive, etc. Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A multi-level electrical distribution control system associated with an electrical distribution grid, the multi-level electrical distribution control system comprising:
a first distribution network node controller (DNNC) component including a first DNNC data component configured to access electrical distribution grid data related to the electrical distribution grid or electrical distribution control system data related to the electrical distribution control system, wherein the first DNNC component is configured to facilitate access to the electrical distribution grid data related to the electrical distribution grid or the electrical distribution control system data related to the electrical distribution control system by a second DNNC component; and
a subscriber device configured to facilitate access to an energy access priority designation associated with a subscriber profile and to communicate the energy access priority designation to the first DNNC to facilitate energy distribution planning associated with future energy distribution via the electrical distribution grid, wherein the energy access priority designation is associated with a first energy demand for electrical energy service and another energy demand for additional electrical energy service.

2. The system of claim 1, wherein the first DNNC component is further configured to process the electrical distribution grid data related to the electrical distribution grid into the electrical distribution control system data related to the electrical distribution control system.

3. The system of claim 1, wherein the first DNNC component is further configured to process the electrical distribution control system data related to the electrical distribution control system into additional electrical distribution control system data related to the electrical distribution control system.

4. The system of claim 1, wherein the first DNNC component is further configured to generate secured electrical distribution control system data related to the electrical distribution control system.

5. The system of claim 4, wherein the secured electrical distribution control system data related to the electrical distribution control system is at least one of encrypted, stored in a secure zone, or encapsulated in a wrapper having at least one security feature.

6. The system of claim 1, wherein the first DNNC component further comprises a storage component configured to store electrical distribution control system data related to the electrical distribution control system for access by the second DNNC component.

7. The system of claim 1, wherein the first DNNC component encapsulates electrical distribution control system data related to the electrical distribution control system in a payload portion of a first encapsulated DNNC data element (EDDE).

8. The system of claim 7, wherein the first EDDE further comprises an identifier portion to facilitate access by the second DNNC component to the payload portion of the first EDDE.

9. The system of claim 7, wherein the payload portion of the first EDDE further comprises a payload size portion or a payload identifier portion to facilitate access by the second DNNC component to the payload portion of the first EDDE.

10. The system of claim 7, wherein the payload portion of the first EDDE is configured to encapsulate the electrical distribution grid data related to the electrical distribution grid, an object having data or routines, a reference to data, executable code, or another instance of an EDDE.

11. The system of claim 1, wherein the first DNNC component is further configured to correlate the electrical distribution grid data related to the electrical distribution grid or the electrical distribution control system data related to the electrical distribution control system with geographical information system (GIS) data.

12. A method, comprising:
accessing electrical distribution grid data of an electrical distribution grid;
accessing an energy access priority designation associated with a subscriber profile, wherein the energy access priority designation is associated with a first energy demand for electrical energy service and another energy demand for additional electrical energy service beyond the electrical energy service;
processing the electrical distribution grid data and the energy access priority designation into a first distribution network node controller DNNC data at a first control node of a multi-level electrical distribution control system associated with the electrical distribution grid; and
storing the DNNC data for future access.

13. The method of claim 12, further comprising facilitating access to the electrical distribution grid data of the electrical distribution grid by wrapping the electrical distribution grid data in an encapsulated DNNC data element (EDDE).

14. The method of claim 12, further comprising facilitating access to the first DNNC data by wrapping the DNNC data in an encapsulated DNNC data element (EDDE).

15. The method of claim 12, further comprising:
accessing the first DNNC data;
determining a second DNNC data based, at least in part, on the first DNNC data;
setting an electrical distribution control system control value, based at least in part, on the second DNNC data; and
facilitating access to the first or second DNNC data by encapsulating the first or second DNNC data in an encapsulated DNNC data element (EDDE).

16. The method of claim 12, further comprising:
accessing the first DNNC data;
determining at least one status value related to the electrical distribution grid, based, at least in part, on the first DNNC data; and
setting an electrical distribution control system control value, based at least in part, on the at least one status value.

17. The method of claim 16, wherein the electrical distribution control system control value indicates at least one of a fault condition, an environmental condition, an energy consumption condition, an aggregate subscriber condition, or a sharing plan condition.

18. The system of claim 1, wherein a first pricing model is applied to energy consumption up to the floor energy demand, a second pricing model is applied to energy consumption above the floor energy demand and up to the other energy demand, and a third pricing model is applied to energy consumption above the other energy demand.

19. The method of claim 12, wherein a first pricing model is associated with subscriber energy consumption up to the floor energy demand, a second pricing model is associated with energy consumption above the floor energy demand and up to the other energy demand, and a third pricing model is associated with energy consumption above the other energy demand.

20. The method of claim 12, wherein a first pricing model is associated with subscriber energy consumption up to a first level less than the floor energy demand, a second pricing model is associated with energy consumption above the first level and up to the floor energy demand, a third pricing model is associated with energy consumption above the floor energy demand and up to the other energy demand, and a fourth pricing model is associated with energy consumption above the other energy demand.

* * * * *